(12) United States Patent
Noda

(10) Patent No.: US 11,577,205 B2
(45) Date of Patent: Feb. 14, 2023

(54) SEPARATION APPARATUS AND METHOD OF OPERATING SEPARATION APPARATUS

(71) Applicant: NGK INSULATORS, LTD., Nagoya (JP)

(72) Inventor: Kenichi Noda, Nagoya (JP)

(73) Assignee: NGK Insulators, LTD., Nagoya (JP)

(*) Notice: Subject to any disclaimer, the term of this patent is extended or adjusted under 35 U.S.C. 154(b) by 174 days.

(21) Appl. No.: 16/912,838

(22) Filed: Jun. 26, 2020

(65) Prior Publication Data

US 2021/0016233 A1    Jan. 21, 2021

(30) Foreign Application Priority Data

Jul. 19, 2019   (JP) .............................. JP2019-133576
Jun. 23, 2020   (JP) .............................. JP2020-107788

(51) Int. Cl.
  *B01D 71/02* (2006.01)
  *B01D 63/06* (2006.01)
  (Continued)

(52) U.S. Cl.
  CPC ......... *B01D 71/028* (2013.01); *B01D 63/065* (2013.01); *B01D 65/003* (2013.01);
  (Continued)

(58) Field of Classification Search
  CPC .............. B01D 71/028; B01D 63/065; B01D 65/003; B01D 2313/02; B01D 2313/08;
  (Continued)

(56) References Cited

U.S. PATENT DOCUMENTS

2004/0173094 A1   9/2004   Nakayama et al.
2011/0024342 A1   2/2011   Fujita et al.
(Continued)

FOREIGN PATENT DOCUMENTS

EP    3 603 770 A1    2/2020
JP    2003-159518 A1  6/2003
(Continued)

OTHER PUBLICATIONS

M. Kanezashi and Y. S. Lin, Gas Permeation and Diffusion Characteristics of MFI-Type Zeolite Membranes at High Temperatures, J. Phys. Chem. C 2009, 113, 3767-3774. (Year: 2009).*
Masakazu Kondo, et al., "IPA Purification for Lens Cleaning by Vapor Permeation Using Zeolite Membrane," Separation and Purification Technology, vol. 32, 2003, pp. 191-198.
(Continued)

*Primary Examiner* — Pranav N Patel
(74) *Attorney, Agent, or Firm* — Burr Patent Law, PLLC

(57) ABSTRACT

A housing of a separation apparatus includes therein a zeolite membrane complex. A sheath includes therein the housing. A fluid supplied to the inside of the housing has a temperature higher than the temperature around the sheath. A second exhaust port is used to exhaust a permeated substance that has permeated through the zeolite membrane complex in the fluid to the outside of the housing. The permeated substance exhausted from the housing can be led into an exterior space between the sheath and the housing through the second exhaust port and can be exhausted through an exterior exhaust port. At least part of the zeolite membrane complex is included in an inter-port space surrounded by the sheath, the second exhaust port, and the exterior exhaust port. This structure reduces energy required for fluid separation performed under high temperatures.

12 Claims, 11 Drawing Sheets

(51) Int. Cl.
  *B01D 65/00* (2006.01)
  *B01D 69/12* (2006.01)
  *B01D 53/22* (2006.01)

(52) U.S. Cl.
  CPC ...... *B01D 2313/02* (2013.01); *B01D 2313/08* (2013.01); *B01D 2313/22* (2013.01); *B01D 2319/022* (2013.01); *B01D 2319/04* (2013.01)

(58) Field of Classification Search
  CPC .......... B01D 2313/22; B01D 2319/022; B01D 2319/04; B01D 2256/245; B01D 2257/108; B01D 2257/504; B01D 53/228; B01D 63/066; B01D 69/10; B01D 69/12; Y02C 20/40
  See application file for complete search history.

(56) References Cited

U.S. PATENT DOCUMENTS

| | | | | |
|---|---|---|---|---|
| 2018/0147513 A1* | 5/2018 | Ho | .................... | B01D 39/1623 |
| 2020/0330927 A1* | 10/2020 | An | ..................... | B01D 69/08 |
| 2020/0376438 A1* | 12/2020 | Kodama | ............... | B01D 69/142 |
| 2021/0268429 A1* | 9/2021 | van Amsterdam | .... | B01D 71/00 |

FOREIGN PATENT DOCUMENTS

| | | |
|---|---|---|
| JP | 2009-039654 A1 | 2/2009 |
| JP | 2009-066503 A1 | 4/2009 |
| JP | 2009-226374 A1 | 10/2009 |
| JP | 2011-189335 A1 | 9/2011 |
| JP | 2015-044162 A1 | 3/2015 |
| JP | 2019-084497 A1 | 6/2019 |

\* cited by examiner

SEPARATION APPARATUS AND METHOD OF OPERATING SEPARATION APPARATUS

TECHNICAL FIELD

The present invention relates to a separation apparatus and a method of operating the separation apparatus.

CROSS-REFERENCE TO RELATED APPLICATION

This application claims priority benefit under 35 U.S.C. Section 119 of Japanese Patent Application No. 2019-133576 filed in the Japan Patent Office on Jul. 19, 2019 and Japanese Patent Application No. 2020-107788 filed in the Japan Patent Office on Jun. 23, 2020, the entire disclosures of which are incorporated herein by reference.

BACKGROUND ART

Various studies and developments are currently underway on forming a zeolite membrane on a porous support to obtain a zeolite membrane complex and using a molecular sieving function of the zeolite in applications such as specific molecular separation or molecular adsorption.

For example, Japanese Patent Application Laid-Open No. 2003-159518 (Document 1) and Japanese Patent Application Laid-Open No. 2015-044162 (Document 2) propose techniques for separating a mixed gas, using a zeolite membrane. Japanese Patent Application Laid-Open No. 2011-189335 (Document 3) discloses a method of using a gas separation structure that performs gas separation under high temperatures as high as 100° C. to 650° C.

Japanese Patent Application Laid-Open No. 2009-039654 (Document 4), Japanese Patent Application Laid-Open No. 2009-066503 (Document 5), and Japanese Patent Application Laid-Open No. 2009-226374 (Document 6) disclose separation membrane modules that separate water from a mixed solution that contains water and an organic solvent. In these separation membrane modules, a plurality of tube-shaped membrane separation members is arranged inside a cylindrical module body. Each membrane separation member includes a tube-shaped zeolite separation membrane and a housing that surrounds the separation membrane. The mixed solution flows through a cylindrical space between the separation membrane and the outer cylinder. The water in the mixed solution permeates radially inward through the separation membrane, passes through a space on the inner side of the separation membrane, and is discharged out of the module body. The organic solvent in the mixed solution passes through the space between the separation membrane and the outer cylinder and is discharged out of the module body.

"IPA Purification for Lens Cleaning by Vapor Permeation Using Zeolite Membrane," by M. Kondo, et. al., Separation and Purification Technology, 32 (2003), pp. 191-198 (Document 7) discloses a double cylindrical separation membrane module in which a group of double cylindrical tubes is placed in a vacuum container. In each double cylindrical tube, feed vapor flows through a cylindrical space between an outer cylinder and an inner cylinder (zeolite membrane), and components with an affinity for the zeolite membrane permeate radially inward through the inner cylinder. The vapor that has permeated through into the inner side of the inner cylinder flows out from an outer-cylinder end (i.e., one open end of the inner cylinder) into the vacuum container and exhausted to the outside of the vacuum container under suction through an exhaust port provided in the vicinity of the direction of the vapor flow. In this module, the vacuum container is provided with a heater in order to prevent the condensation of the feed vapor.

Japanese Patent Application Laid-Open No. 2019-084497 (Document 8) discloses a gas separation apparatus that includes a separation membrane module including a gas separation membrane element in a housing, a casing including the separation membrane module, and a heat source for adjusting the temperature in the casing.

Incidentally, in the case where a separation membrane module as described above performs fluid separation under high temperatures, it is necessary to heat a fluid to be supplied to the module in advance to a temperature higher than a separation temperature in consideration of, for example, heat dissipation from the housing in which the fluid flows. Or, as in Documents 7 and 8, it is necessary to heat the module or the inside of the casing with use of an external heat source such as a heater. Thus, a great deal of energy is necessary to heat the fluid, which results in an increase in energy required for fluid separation. In particular, in the case where the housing or the module body has a flange structure, the area of heat dissipation increases and accordingly the aforementioned heat dissipation increases. This further increases the energy required for fluid separation.

Moreover, in Document 7, the exhaust port of the vacuum container is provided in the vicinity of the housing end through which the vapor flows out, so as to make it possible to speedily exhaust the vapor that has permeated through the zeolite membrane and flowed out of the outer cylinder into the vacuum container. Thus, the vapor having permeated through the zeolite membrane flows toward the outside of the vacuum container with almost no contact with the outer surface of the housing. Accordingly, the separation membrane module according to Document 7 has only a small effect of suppressing a temperature drop in the housing caused by heat dissipation to the outside.

SUMMARY OF INVENTION

The present invention has been made in light of the above-described problems, and it is an object of the present invention to reduce energy required for fluid separation performed under high temperatures.

The present invention is intended for a separation apparatus. A separation apparatus according to a preferable embodiment of the present invention includes a separation membrane complex including a porous support and a separation membrane formed on the support, a housing including the separation membrane complex, a sheath including therein the housing, and a supply part that supplies a fluid having a temperature higher than a temperature around the sheath to an inside of the housing. The housing has a first exhaust port through which a non-permeated substance in the fluid is exhausted to an outside of the housing, the non-permeated substance being a substance other than a permeated substance that has permeated through the separation membrane complex, and a second exhaust port through which the permeated substance in the fluid is exhausted to the outside of the housing. Either of the permeated substance and the non-permeated substance exhausted from the housing can be led into an exterior space through a lead-in port, the exterior space being a space inside the sheath and between the sheath and the housing. The sheath has an exterior exhaust port through which either of the permeated substance and the non-permeated substance, led into the exterior space through the lead-in port, can be exhausted. At least part of the separation membrane complex is included in a space surrounded by the sheath, the lead-in port, and the exterior exhaust port.

This separation apparatus can reduce energy required for fluid separation performed under high temperatures.

Preferably, the exterior space exists at least in a direction of a normal to a main surface of the separation membrane.

Preferably, the housing includes a tube-shaped part having an opening at least at one end, a flange part extending outward from the tube-shaped part around the opening, and a lid part fixed to the flange part while covering the opening to seal the opening.

Preferably, 50 percent or more of the separation membrane complex by volume is included in the space surrounded by the sheath, the lead-in port, and the exterior exhaust port.

Preferably, either of the permeated substance and the non-permeated substance, described above, is the permeated substance.

Preferably, the separation apparatus further includes a heating part that heats the fluid before the fluid is supplied to the housing.

Preferably, the fluid supplied from the supply part has a temperature higher than or equal to 70° C.

Preferably, the separation apparatus further includes a thermal insulation part arranged around the sheath to thermally insulate at least part of an outer surface of the sheath.

Preferably, the separation membrane is a zeolite membrane.

Preferably, a maximum number of membered rings in a zeolite constituting the zeolite membrane is 8 or less.

Preferably, the fluid contains one or more types of substances among hydrogen, helium, nitrogen, oxygen, water, steam, carbon monoxides, carbon dioxides, nitrogen oxides, ammonia, sulfur oxides, hydrogen sulfides, sulfur fluorides, mercury, arsine, hydrocyanic acids, carbonyl sulfides, C1 to C8 hydrocarbons, organic acids, alcohol, mercaptans, ester, ether, ketone, and aldehyde.

The present invention is also intended for a method of operating a separation apparatus that includes separation membrane complex including a porous support and a separation membrane formed on the support, a housing including therein the separation membrane complex, and a sheath including therein the housing. A method of operating the separation apparatus according to a preferable embodiment of the present invention includes a) supplying a fluid having a higher temperature than a temperature around the sheath to an inside of the housing, b) leading either of a permeated substance in the fluid and a non-permeated substance in the fluid into an exterior space, the permeated substance being a substance that has permeated through the separation membrane complex, the non-permeated substance being a substance other than the permeated substance, the exterior space being a space inside the sheath and between the sheath and the housing, and c) exhausting either of the permeated substance and the non-permeated substance, described above, from the exterior space, the exhausting substance passing through at least part of the exterior space, the exterior space existing in a direction of a normal to a main surface of the separation membrane.

This method of operating the separation apparatus can reduce energy required for fluid separation performed under high temperatures.

These and other objects, features, aspects and advantages of the present invention will become more apparent from the following detailed description of the present invention when taken in conjunction with the accompanying drawings.

DESCRIPTION OF EMBODIMENTS

Figure 1:
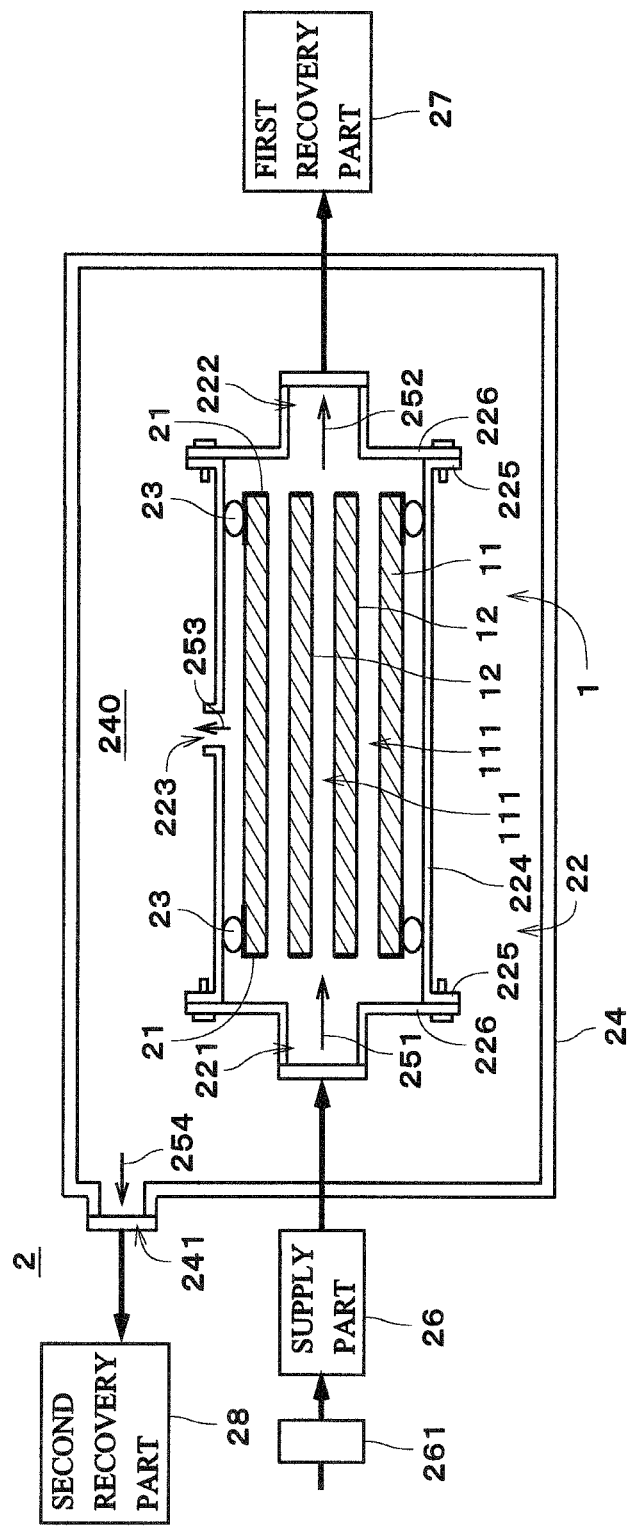
FIG. 1 is an illustration of a separation apparatus according to a first embodiment.

FIG. 1 is an illustration of a schematic structure of a separation apparatus 2 according to a first embodiment of the present invention. In FIG. 1, cross-hatching in the sections of some components is omitted (the same applies to FIGS. 4, 6, 7, and 9 to 12). The separation apparatus 2 is an apparatus for separating substances having high permeability to a zeolite membrane complex 1, which will be described later, from a fluid (i.e., a gas or a liquid). The separation by the separation apparatus 2 may be performed for the purpose of, for example, extracting highly permeable substances from a fluid or condensing low permeable substances.

The aforementioned fluid may be a single type of gas or a mixed gas that contains a plurality of types of gases, may be a single type of liquid or a mixed solution that contains a plurality of types of liquids, or may be a gas-liquid two-phase fluid that contains both gases and liquids.

The fluid contains, for example, one or more types of substances among hydrogen ($H_2$), helium (He), nitrogen ($N_2$), oxygen ($O_2$), water ($H_2O$), steam ($H_2O$), carbon monoxide (CO), carbon dioxide ($CO_2$), nitrogen oxides, ammonia ($NH_3$), sulfur oxides, hydrogen sulfide ($H_2S$), sulfur fluorides, mercury (Hg), arsine ($AsH_3$), hydrogen cyanide (HCN), carbonyl sulfide (COS), C1 to C8 hydrocarbons, organic acids, alcohol, mercaptans, ester, ether, ketone, and aldehyde.

Nitrogen oxides are compounds of nitrogen and oxygen. The aforementioned nitrogen oxides are, for example, gases called $NO_X$ such as nitrogen monoxide (NO), nitrogen dioxide ($NO_2$), nitrous oxide (also referred to as dinitrogen monoxide) ($N_2O$), dinitrogen trioxide ($N_2O_3$), dinitrogen tetroxide ($N_2O_4$), and dinitrogen pentoxide ($N_2O_5$).

Sulfur oxides are compounds of sulfur and oxygen. The aforementioned sulfur oxides are, for example, gases called $SO_X$ such as sulfur dioxide ($SO_2$) and sulfur trioxide ($SO_3$).

Sulfur fluorides are compounds of fluorine and sulfur. Examples of the aforementioned sulfur fluorides include disulfur difluoride (F—S—S—F, S=$SF_2$), sulfur difluoride ($SF_2$), sulfur tetrafluoride ($SF_4$), sulfur hexafluoride ($SF_6$), and disulfur decafluoride ($S_2F_{10}$).

C1 to C8 hydrocarbons are hydrocarbons containing one or more and eight or less carbon atoms. C3 to C8 hydrocarbons may be any of linear-chain compounds, side-chain compounds, and cyclic compounds. C2 to C8 hydrocarbons may be either saturated hydrocarbons (i.e., the absence of double bonds and triple bonds in molecules) or unsaturated hydrocarbons (i.e., the presence of double bonds and/or triple bonds in molecules). Examples of C1 to C4 hydrocarbons include methane ($CH_4$), ethane ($C_2H_6$), ethylene ($C_2H_4$), propane ($C_3H_8$), propylene ($C_3H_6$), normal butane ($CH_3(CH_2)_2CH_3$), isobutane ($CH(CH_3)_3$), 1-butene ($CH_2$=$CHCH_2CH_3$), 2-butene ($CH_3CH$=$CHCH_3$), and isobutene ($CH_2$=$C(CH_3)_2$).

The aforementioned organic acids are, for example, carboxylic acids or sulfonic acids. Examples of the carboxylic acids include formic acids ($CH_2O_2$), acetic acids ($C_2H_4O_2$), oxalic acids ($C_2H_2O_4$), acrylic acids ($C_3H_4O_2$), and benzoic acids ($C_6H_5COOH$). The sulfonic acids are, for example, ethane sulfonic acids ($C_2H_6O_3S$). These organic acids may be either chain compounds or cyclic compounds.

Examples of the aforementioned alcohol include methanol ($CH_3OH$), ethanol ($C_2H_5OH$), isopropanol (2-propanol) ($CH_3CH(OH)CH_3$), ethylene glycol ($CH_2(OH)CH_2(OH)$), and butanol ($C_4H_9OH$).

The mercaptans are organic compounds with hydrogenerated sulfur (SH) at their terminals and are substances also called thiol or thioalcohol. Examples of the aforementioned mercaptans include methyl mercaptans ($CH_3SH$), ethyl mercaptans ($C_2H_5SH$), and 1-propane thiols ($C_3H_7SH$).

Examples of the aforementioned ester include formic acid ester and acetic acid ester.

Examples of the aforementioned ether include dimethyl ether (($CH_3)_2O$), methyl ethyl ether ($C_2H_5OCH_3$), and diethyl ether (($C_2H_5)_2O$).

Examples of the aforementioned ketone include acetone (($CH_3)_2CO$), methyl ethyl ketone ($C_2H_5COCH_3$), and diethyl ketone (($C_2H_5)_2CO$).

Examples of the aforementioned aldehyde include acetaldehyde ($CH_3CHO$), propionaldehyde ($C_2H_5CHO$), and butanal (butyraldehyde) ($C_3H_7CHO$).

The following description is given on the assumption that the fluid to be separated by the separation apparatus 2 is a mixture of substances that contains a plurality of types of gases (i.e., a mixed gas).

The separation apparatus 2 includes the zeolite membrane complex 1, sealing parts 21, a housing 22, two seal members 23, a sheath 24, a supply part 26, a first recovery part 27, and a second recovery part 28. The zeolite membrane complex 1, the sealing parts 21, and the seal members 23 are placed inside the housing 22. The housing 22 is placed inside the sheath 24. The supply part 26, the first recovery part 27, and the second recovery part 28 are arranged outside the sheath 24.

Figure 2:
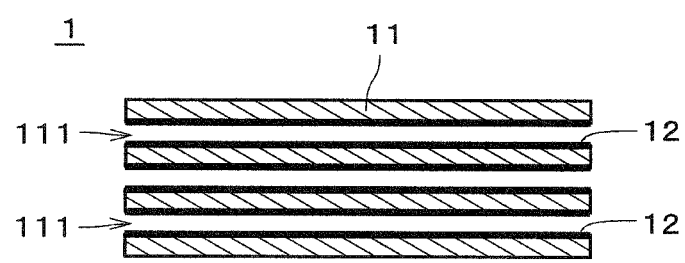
FIG. 2 is a sectional view of a zeolite membrane complex.
Figure 3:
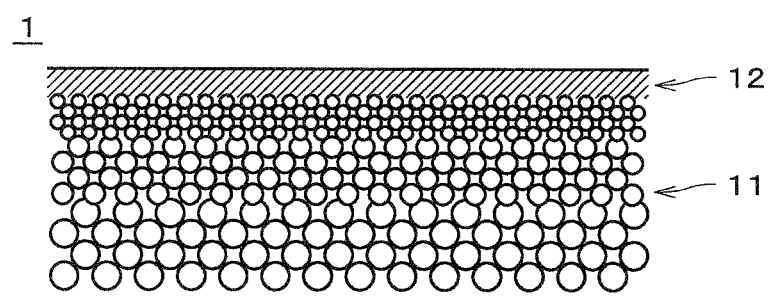
FIG. 3 is an enlarged sectional view of the zeolite membrane complex.

FIG. 2 is a sectional view of the zeolite membrane complex 1. FIG. 3 is a sectional view illustrating part of the zeolite membrane complex 1 in enlarge dimensions. The zeolite membrane complex 1 is a separation membrane complex that includes a porous support 11 and a zeolite membrane 12 that is a separation membrane formed on the support 11. The zeolite membrane 12 refers to at least a zeolite formed in a membrane on the surface of the support 11, and does not include zeolite particles that are merely dispersed in an organic membrane. The zeolite membrane 12 may include two or more types of zeolites having different structures or compositions. In FIG. 2, the zeolite membrane 12 is illustrated with bold lines. In FIG. 3, the zeolite membrane 12 is cross-hatched. In FIG. 3, the zeolite membrane 12 is illustrated thicker than the actual one.

The support 11 is a porous member permeable to gases and liquids. In the example illustrated in FIG. 2, the support 11 is a monolith support having a plurality of through holes 111 each extending in a longitudinal direction (i.e., an right-left direction in FIG. 2) and formed in an integral columnar body that is molded integrally. In the example illustrated in FIG. 2, the support 11 has a substantially circular columnar shape. Each through hole 111 (i.e., cell) has, for example, a substantially circular cross-section perpendicular to the longitudinal direction. In the illustration of FIG. 2, the diameter of the through holes 111 is greater than the actual diameter, and the number of through holes 111 is smaller than the actual number. The zeolite membrane 12 is formed on the inner surfaces of the through holes 111 and covers substantially the entire inner surfaces of the through holes 111.

The support 11 has a length of, for example, 10 cm to 200 cm (i.e., length in the right-left direction in FIG. 2). The support 11 has an outer diameter of, for example, 0.5 cm to 30 cm. The distance between the central axes of each pair of adjacent through holes 111 is, for example, in the range of 0.3 mm to 10 mm. The surface roughness (Ra) of the support 11 is, for example, in the range of 0.1 μm to 5.0 μm and preferably in the range of 0.2 μm to 2.0 μm. Alternatively, the support 11 may have a different shape such as a honeycomb shape, a flat plate shape, a tubular shape, a circular cylindrical shape, a circular columnar shape, or a polygonal prism shape. When having a tubular shape or a circular cylindrical shape, the support 11 has a thickness of, for example, 0.1 mm to 10 mm.

As the material for the support 11, various substances (e.g., a ceramic or a metal) may be employed as long as they have chemical stability in the step of forming the zeolite membrane 12 on the surface. In the present embodiment, the support 11 is formed of a ceramic sintered compact. Examples of the ceramic sintered compact to be selected as the material for the support 11 include alumina, silica, mullite, zirconia, titania, yttrium, silicon nitride, and silicon carbide. In the present embodiment, the support 11 contains at least one of alumina, silica, and mullite.

The support 11 may contain an inorganic binder. The inorganic binder may be at least one of titania, mullite, easily sinterable alumina, silica, glass frit, clay minerals, and easily sinterable cordierite.

A mean pore diameter of the support 11 is, for example, in the range of 0.01 μm to 70 μm and preferably in the range of 0.05 μm to 25 μm. A mean pore diameter of the support 11 in the vicinity of the surface where the zeolite membrane 12 is formed is in the range of 0.01 μm to 1 μm and preferably in the range of 0.05 μm to 0.5 μm. The mean pore diameters can be measured by, for example, a mercury porosimeter, a perm porosimeter, or a nano-perm porosimeter. As to a pore size distribution of the support 11 as a whole including the surface and inside of the support 11, D5 is in the range of, for example, 0.01 μm to 50 μm, D50 is in the range of, for example, 0.05 μm to 70 μm, and D95 is in the range of, for example, 0.1 μm to 2000 μm. The porosity of the support 11 in the vicinity of the surface where the zeolite membrane 12 is formed is, for example, in the range of 20% to 60%.

The support 11 has, for example, a multilayer structure in which a plurality of layers having different mean pore diameters are laminated one above another in a thickness direction. A surface layer that includes the surface where the zeolite membrane 12 is formed has a smaller mean pore diameter and a smaller sintered particle diameter than the remaining layers other than the surface layer. A mean pore diameter of the surface layer of the support 11 is, for example, in the range of 0.01 µm to 1 µm and preferably in the range of 0.05 µm to 0.5 µm. In the case where the support 11 has a multilayer structure, the material for each layer may be any of the above-described materials. The plurality of layers forming the multilayer structure may be formed of the same material, or may be formed of different materials.

The zeolite membrane 12 is a porous membrane having microscopic pores (micropores). The zeolite membrane 12 can be used as a separation membrane that separates a specific substance from a fluid obtained by mixing a plurality of types of substances, using a molecular sieving function. The zeolite membrane 12 is less permeable to the other substances than to the specific substance. In other words, the amount by which the other substances permeate through the zeolite membrane 12 is smaller than the amount by which the above-described specific substance permeates through the zeolite membrane 12.

The thickness of the zeolite membrane 12 is, for example, in the range of 0.05 µm to 30 µm, preferably in the range of 0.1 µm to 20 µm, and more preferably in the range of 0.5 µm to 10 µm. As the thickness of the zeolite membrane 12 increases, separation performance improves. As the thickness of the zeolite membrane 12 decreases, the rate of permeation increases. The surface roughness (Ra) of the zeolite membrane 12 is, for example, 5 µm or less, preferably 2 µm or less, more preferably 1 µm or less, and yet more preferably 0.5 µm or less.

A mean pore diameter of zeolite crystals contained in the zeolite membrane 12 (hereinafter, also simply referred to as a "mean pore diameter of the zeolite membrane 12") is preferably greater than or equal to 0.2 nm and less than or equal to 0.8 nm, more preferably greater than or equal to 0.3 nm and less than or equal to 0.5 nm, and yet more preferably greater than or equal to 0.3 nm and less than or equal to 0.4 nm. The mean pore diameter of the zeolite membrane 12 refers to an arithmetical mean of a maximum pore diameter of the zeolite crystals constituting the zeolite membrane 12 (i.e., a major axis that is a maximum value of the distances between oxygen atoms) and a pore diameter (i.e., a minor axis) in a direction substantially perpendicular to the major axis. The mean pore diameter of the zeolite membrane 12 is smaller than the mean pore diameter of the support 11 in the vicinity of the surface where the zeolite membrane 12 is formed.

When n is the maximum number of membered rings in the zeolite constituting the zeolite membrane 12, an arithmetical mean of the major and minor axes of an n-membered ring pore is assumed to be a mean pore diameter. In the case where the zeolite has a plurality of n-membered ring pores where n is the same number, an arithmetical mean of the major and minor axes of all of the n-membered ring pores is assumed to be the mean pore diameter of the zeolite. Not that an n-membered ring refers to a ring in which n oxygen atoms constitute the framework of a pore and each oxygen atom is bonded together with a T atom described later to form a ring structure. The n-membered ring also refers to a ring that forms a through hole (channel), and does not include a ring that fails to form a through hole. An n-membered ring pore refers to a pore formed by an n-membered ring. A maximum number of membered rings in the zeolite contained in the zeolite membrane 12 is preferably 8 or less (e.g., 6 or 8).

The mean pore diameter of the zeolite membrane is uniquely determined by the framework structure of the zeolite and can be obtained from a value presented in the "Database of Zeolite Structures" by the International Zeolite Association, [online], from Internet <URL:http://www.iza-structure.org/databases/>.

The zeolite membrane 12 is composed of, for example, a DDR-type zeolite. In other words, the zeolite membrane 12 is a zeolite membrane composed of a zeolite having a framework type code "DDR" assigned by the International Zeolite Association. In this case, the zeolite constituting the zeolite membrane 12 has an intrinsic pore diameter of 0.36 nm×0.44 nm and a mean pore diameter of 0.40 nm.

The type of the zeolite constituting the zeolite membrane 12 is not particularly limited and, for example, may be any of the followings: AEI-type, AEN-type, AFN-type, AFV-type, AFX-type, BEA-type, CHA-type, DDR-type, ERI-type, ETL-type, FAU-type (X-type, Y-type), GIS-type, LEV-type, LTA-type, MEL-type, MFI-type, MOR-type, PAU-type, RHO-type, SAT-type, and SOD-type. More preferably, the zeolite may, for example, be any of the followings: AEI-type, AFN-type, AFV-type, AFX-type, CHA-type, DDR-type, ERI-type, ETL-type, GIS-type, LEV-type, LTA-type, PAU-type, RHO-type, and SAT-type. Yet more preferably, the zeolite may, for example, be any of the followings: AEI-type, AFN-type, AFV-type, AFX-type, CHA-type, DDR-type, ERI-type, ETL-type, GIS-type, LEV-type, PAU-type, RHO-type, and SAT-type.

The zeolite constituting the zeolite membrane 12 contains, for example, aluminum (Al) as T atoms (i.e., atoms located in the center of an oxygen tetrahedron ($TO_4$) that constitutes the zeolite). The zeolite constituting the zeolite membrane 12 may, for example, be a zeolite in which T atoms are composed of only silicon (Si) or of Si and Al; an AlPO-type zeolite in which T atoms are composed of Al and phosphorus (P); an SAPO-type zeolite in which T atoms are composed of Si, Al, and P; an MAPSO-type zeolite in which T atoms are composed of magnesium (Mg), Si, Al, and P; or a ZnAPSO-type zeolite in which T atoms are composed of zinc (Zn), Si, Al, and P. Some of the T atoms may be replaced by other elements.

The zeolite membrane 12 contains, for example, Si. For example, the zeolite membrane 12 may contain any two or more of Si, Al, and P. The zeolite membrane 12 may contain alkali metal. The alkali metal is, for example, sodium (Na) or potassium (K). In the case where the zeolite membrane 12 contains Si atoms and Al atoms, the Si/Al ratio in the zeolite membrane 12 is, for example, 1 or more and 100,000 or less. The Si/Al ratio is a molar ratio of Si elements to Al elements contained in the zeolite membrane 12. The Si/Al ratio is preferably 5 or more, more preferably 20 or more, and yet more preferably 100 or more. This ratio is preferably as high as possible. The Si/Al ratio in the zeolite membrane 12 can be adjusted by adjusting, for example, the composition ratio of an Si source and an Al source in a starting material solution, which will be described later.

The amount of $CO_2$ permeation (permeance) through the zeolite membrane 12 at a temperature of 20° C. to 400° C. is, for example, 100 nmol/$m^2$·s·Pa or more. The ratio (permeance ratio) of $CO_2$ permeation and $CH_4$ leakage in the zeolite membrane 12 at a temperature of 20° C. to 400° C. is, for example, 100 or higher. These permeance and permeance ratio are values for the case where a difference in partial pressure of $CO_2$ between the supply and permeation sides of the zeolite membrane 12 is 1.5 MPa.

Next, an example of the procedure for producing the zeolite membrane complex 1 will be described. In the production of the zeolite membrane complex 1, first, seed crystals for use in the production of the zeolite membrane 12 are prepared. The seed crystals are, for example, acquired from DDR-type zeolite powder generated by hydrothermal synthesis. This zeolite powder may be used as-is as seed crystals, or may be processed into seed crystals by, for example, pulverization.

Then, the porous support 11 is immersed in a solution in which the seed crystals are dispersed, so that the seed crystals are deposited on the support 11. Alternatively, a solution in which the seed crystals are dispersed may be brought into contact with a portion of the support 11 on which the zeolite membrane 12 is desired to be formed, so that the seed crystals are deposited on the support 11. In this way, a seed-crystal-deposited support is prepared. The seed crystals may be deposited by other methods on the support 11.

The support 11 with the seed crystals deposited thereon is immersed in a starting material solution. The starting material solution is prepared by, for example, dissolving substances such as an Si source and a structure-directing agent (hereinafter, also referred to as an "SDA") in a solvent. The solvent in the starting material solution may, for example, be water or alcohol such as ethanol. The SDA contained in the starting material solution may, for example, be an organic substance. As the SDA, for example, 1-adamantanamine may be used.

Then, a DDR-type zeolite is grown by hydrothermal synthesis using the seed crystals as nuclei to form a DDR-type zeolite membrane 12 on the support 11. The temperature of the hydrothermal synthesis is preferably in the range of 120 to 200° C. and, for example, 160° C. The hydrothermal synthesis time is preferably in the range of 10 to 100 hours and, for example, 30 hours.

After the hydrothermal synthesis is completed, the support 11 and the zeolite membrane 12 are rinsed with deionized water. After the rinsing, the support 11 and the zeolite membrane 12 are dried at, for example, 80° C. After the support 11 and the zeolite membrane 12 have been dried, the zeolite membrane 12 is subjected to heat treatment so as to almost completely burn and remove the SDA in the zeolite membrane 12 and to cause micropores in the zeolite membrane 12 to come through the membrane. In this way, the aforementioned zeolite membrane complex 1 is obtained.

The sealing part 21 of the separation apparatus 2 illustrated in FIG. 1 is a member that is mounted on the opposite ends of the support 11 of the zeolite membrane complex 1 in the longitudinal direction (i.e., the right-left direction in FIG. 1) and that covers and seals the opposite end faces of the support 11 in the longitudinal direction and the outer surface of the support 11 in the vicinity of the opposite end faces. The sealing part 21 prevents the inflow and outflow of gases from the opposite end faces of the support 11. The sealing part 21 is, for example, a plate-like member formed of glass or a resin. The material and shape of the sealing part 21 may be appropriately changed. Since the sealing part 21 has a plurality of openings that overlap a plurality of through holes 111 of the support 11, the opposite ends of each through hole 111 of the support 11 in the longitudinal direction are not covered with the sealing part 21. This allows the inflow and outflow of gases or the like from the opposite ends into the through holes 111.

The housing 22 is a tube-shaped member having a substantially cylindrical shape, although the shape of the housing 22 is not limited thereto. The housing 22 is formed of, for example, stainless steel or carbon steel. The longitudinal direction of the housing 22 is substantially parallel to the longitudinal direction of the zeolite membrane complex 1. One end of the housing 22 in the longitudinal direction (i.e., the end on the left side in FIG. 5) has a supply port 221, and the other end thereof has a first exhaust port 222. The side face of the housing 22 has a second exhaust port 223. The supply port 221 is connected to the supply part 26. The first exhaust port 222 is connected to the first recovery part 27. The internal space of the housing 22 is an enclosed space isolated from the space around the housing 22.

In the example illustrated in FIG. 1, the housing 22 includes a tube-shaped part 224, two flange parts 225, and two lid parts 226. The tube-shaped part 224 is a substantially cylindrical portion having openings at opposite ends in the longitudinal direction. The two flange parts 225 are substantially ring-shaped plate-like portions that extend radially outward from the tube-shaped part 224 around the above-described two openings of the tube-shaped part 224, respectively. The tube-shaped part 224 and the two flange parts 225 form an integral member. The two lid parts 226 are respectively fixed to the two flange parts 225 with bolts or other fasteners while covering the above-described two openings of the tube-shaped part 224. Accordingly, the two openings of the tube-shaped part 224 are sealed air-tight.

The aforementioned supply port 221 is provided on the lid part 226 on the left side in FIG. 1. The first exhaust port 222 is provided on the lid part 226 on the right side in FIG. 1. The second exhaust port 223 is provided on substantially the center of the tube-shaped part 224 in the longitudinal direction. Note that the tube-shaped part 224 of the housing 22 may have an opening only at one end in the longitudinal direction. In this case, a flange part 225 and a lid part 226 are provided on only this one side in the longitudinal direction.

The two seal members 23 are arranged around the entire circumference between the outer side face of the zeolite membrane complex 1 and the inner side face of the housing 22 in the vicinity of the opposite ends of the zeolite membrane complex 1 in the longitudinal direction. Each seal member 23 is a substantially circular ring-shaped member formed of a material impermeable to gases. The seal members 23 are, for example, O rings formed of a resin having flexibility. The seal members 23 are in intimate contact with the outer side face of the zeolite membrane complex 1 and the inner side face of the housing 22 around the entire circumference. In the example illustrated in FIG. 1, the seal members 23 are in intimate contact with the outer side face of the sealing part 21 and are in intimate contact with the outer side face of the zeolite membrane complex 1 indirectly via the sealing part 21. The part between the seal members 23 and the outer side face of the zeolite membrane complex 1 and the part between the seal members 23 and the inner side face of the housing 22 are sealed so as to almost or completely disable the permeation of gases.

The sheath 24 is, for example, a substantially cylindrical member having closed opposite ends in the longitudinal direction, although the shape of the sheath 24 is not limited thereto. The sheath 24 is formed of, for example, stainless steel or carbon steel. The longitudinal direction of the sheath 24 is substantially parallel to the longitudinal directions of the zeolite membrane complex 1 and the housing 22. The internal space of the sheath 24 is an enclosed space isolated from the space around the sheath 24. In the internal space of the sheath 24, the housing 22 is supported by a support member or any other like member (not shown), apart from the inner side face of the sheath 24. The housing 22 is arranged in substantially the center of the internal space of the sheath 24 in both the radial direction and the longitudinal direction. Thus, inside the sheath 24, a space 240 (hereinafter, also referred to as an "exterior space 240") is formed between the sheath 24 and the housing 22. The radial width of the exterior space 240 between the inner side face of the sheath 24 and the outer side face of the tube-shaped part 224 of the housing 22 is substantially constant around the entire circumference.

In the example illustrated in FIG. 1, the housing 22 as a whole is placed inside the sheath 24, but part of the housing 22 may be exposed to the outside from the sheath 24. In other words, part of the housing 22 may be placed inside the sheath 24. For example, the tube-shaped part 224 as a whole of the housing 22 may be placed inside the sheath 24, and the other portions of the housing 22 except the tube-shaped part 224 may be exposed to the outside from the sheath 24. In this case, the exterior space 240 exists at least in the direction of the normal to the outer side face of the tube-shaped part 224. In other words, the exterior space 240 exists at least in the direction of the normal to the main surface of the zeolite membrane 12 of the zeolite membrane complex 1 (i.e., at least in the direction of the normal to the inner side faces of the through holes 111 of the support 11).

The supply port 221 of the housing 22 is connected to the supply part 26 by piping that passes air-tight through the sheath 24. The first exhaust port 222 of the housing 22 is connected to the first recovery part 27 by piping that passes air-tight through the sheath 24. The second exhaust port 223 of the housing 22 is open to the internal space of the sheath 24. A gas led to the second exhaust port 223 of the housing 22 is exhausted from the second exhaust port 223 to the exterior space 240. That is, in the example illustrated in FIG. 1, the second exhaust port 223 serves as a lead-in port though which gases can be led into the exterior space 240. The gas in the exterior space 240 is exhausted to the outside of the sheath 24 through an exterior exhaust port 241 provided at an end of the sheath 24 in the longitudinal direction (e.g., an end on the left side in FIG. 1). The exterior exhaust port 241 is connected to the second recovery part 28.

Note that the second exhaust port 223 of the housing 22 may be connected to the second recovery part 28 by piping that extends through the internal space of the sheath 24 and passes air-tight through the sheath 24. In this case, the destination to which gases from the second exhaust port 223 are sent out is switched by a valve or other device, so as to switch the second exhaust port 223 between a state of being connected to the second recovery part 28 by the aforementioned piping and a state of functioning as a lead-in port that is open to the internal space of the sheath 24. In this case, the exterior exhaust port 241 may be connected to the second recovery part 28, or may not be connected to the second recovery part 28. With the second exhaust port 223 connected to the second recovery part 28 by the above-described piping, gases exhausted from the second exhaust port 223 are exhausted to the outside of the sheath 24 without being supplied to the exterior space 240. That is, the gases exhausted from the second exhaust port 223 of the housing 22 can be led into the exterior space 240 through the second exhaust port 223 (i.e., lead-in port), but it is also possible not to lead these gases into the exterior space 240.

As another alternative, part of the gas exhausted from the second exhaust port 223 may be led into the exterior space 240 through the second exhaust port 223, and the remaining gas may be exhausted out of the sheath 24 without being led into the exterior space 240. The number of exterior exhaust ports 241 provided on the sheath 24 may be one, or may be two or more. Each exterior exhaust port 241 can be opened or closed as necessary. In the case where the sheath 24 has a plurality of exterior exhaust ports 241, the gas led into the exterior space 240 may be exhausted from one or more exterior exhaust ports 241 to the outside of the sheath 24.

Figure 4:
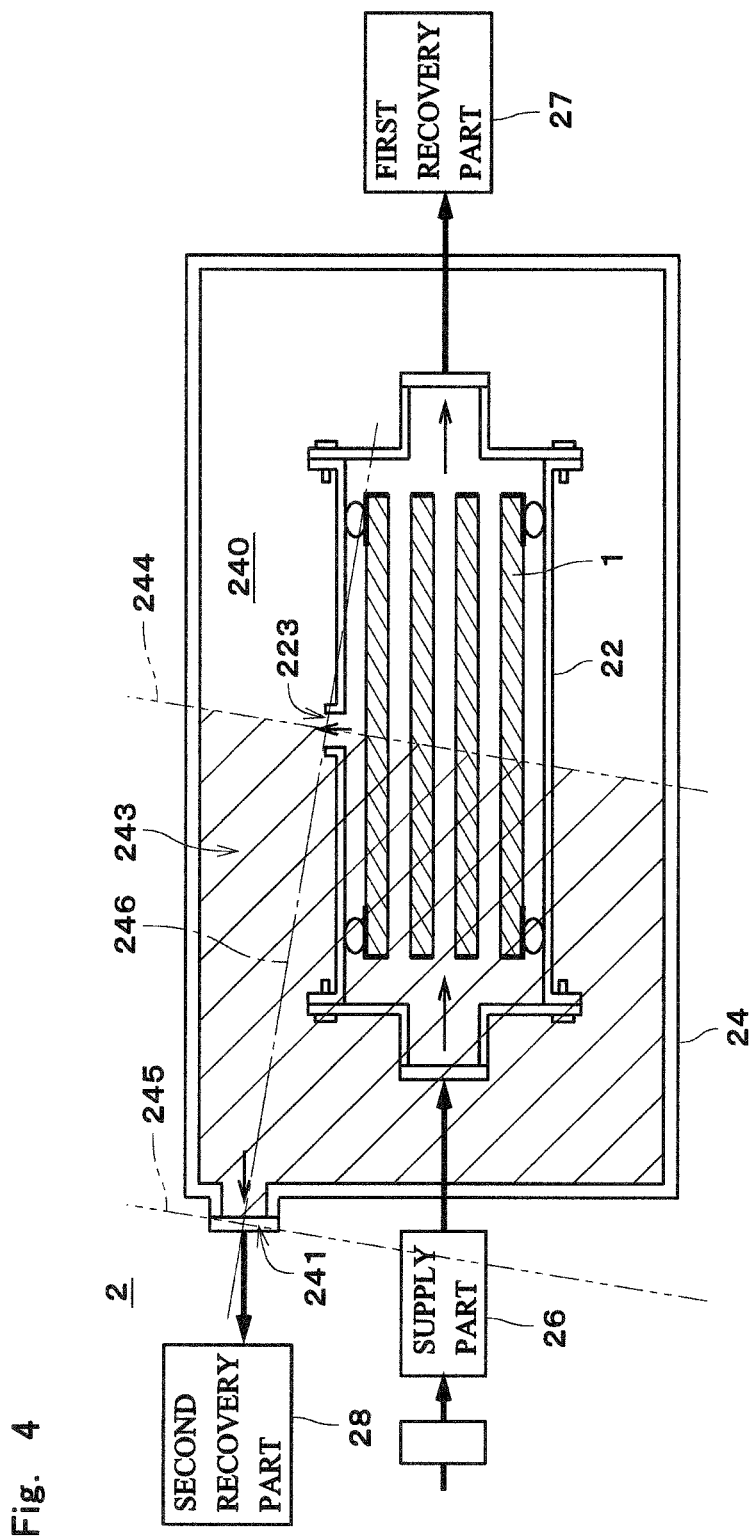
FIG. 4 is an illustration of a separation apparatus.

In the separation apparatus 2, at least part of the zeolite membrane complex 1 is included in a space 243 indicated by cross-hatching in FIG. 4. This space 243 is a space surrounded by the sheath 24, the lead-in port (in the example in FIG. 4, the second exhaust port 223), and the exterior exhaust port 241 and is also referred to as an "inter-port space 243." In the separation apparatus 2, the lead-in port and the exterior exhaust port 241 are arranged such that at least part of the zeolite membrane complex 1 is included in the inter-port space 243. Preferably, 50 percent or more of the zeolite membrane complex 1 by volume is included in the inter-port space 243.

Here, the inter-port space 243 is the internal space of the sheath 24 and is a space sandwiched between a lead-in-port plane 244 and an exterior-exhaust-port plane 245. The lead-in-port plane 244 refers to a plane that passes through substantially the center of the lead-in port and that is vertical to a straight line 246 connecting substantially the center of the lead-in port of the housing 22 and substantially the center of the exterior exhaust port 241. The exterior-exhaust-port plane 245 refers to a plane that passes through substantially the center of the exterior exhaust port 241 and that is vertical to the above-described straight line 246. That is, the inter-port space 243 is a space that is included inside the sheath 24 and that is sandwiched between the lead-in-port plane 244 and the exterior-exhaust-port plane 245, the planes 244 and 245 being parallel to each other.

In the separation apparatus 2, in the case where a plurality of exterior exhaust ports 241 are provided on a single sheath 24 and/or a plurality of lead-in ports are provided inside a single sheath 24, the aforementioned inter-port space 243 corresponds to a set of all inter-port spaces that correspond respectively to all combinations of the exterior exhaust ports 241 and the lead-in ports. That is, the aforementioned inter-port space 243 includes all inter-port spaces obtained for each combination of the exterior exhaust ports 241 and the lead-in ports provided on and inside the single sheath 24. In the case of obtaining the capacity of the inter-port space 243, the capacity of overlapping portions of each inter-port space in the set of all inter-port spaces is not redundantly added to the capacity.

The supply part 26 supplies a mixed gas into the internal space of the housing 22 through the supply port 221. The supply part 26 includes, for example, a blower or a pump that feeds the mixed gas into the housing 22 under pressure. This blower or pump includes a pressure regulator that regulates the pressure of the mixed gas supplied to the housing 22. The supply part 26 includes a heating part 261 that heats the mixed gas before the mixed gas is supplied to the housing 22. The heating part 261 includes, for example, an electric heater. The first recovery part 27 includes, for example, a reservoir that stores the gas led out of the housing 22, or a blower or a pump that transfers this gas. The second recovery part 28 includes, for example, a reservoir that stores the gas led out of the sheath 24, or a blower or a pump that transfers this gas.

Next, an example of the procedure for gas separation from mixed gas performed by the separation apparatus 2 (i.e., the method of operating the separation apparatus 2) will be described with reference to FIG. 5. In the gas separation from the mixed gas, first, the aforementioned separation apparatus 2 is prepared to provide the zeolite membrane complex 1. Then, a mixed gas that contains a plurality of gases that differ in permeability to the zeolite membrane 12 is supplied from the supply part 26 to the internal space of the housing 22 (step S11). For example, the mixed gas is composed primarily of $CO_2$ and $CH_4$. The mixed gas may contain gases other than $CO_2$ and $CH_4$.

The pressure (i.e., initial pressure) of the mixed gas supplied from the supply part 26 to the internal space of the housing 22 is in the range of, for example, 0.1 MPa to 20.0 MPa. The temperature of the mixed gas supplied from the supply part 26 is higher than the temperature around the sheath 24 (i.e., the temperature of the outside of the sheath 24). The temperature of the mixed gas supplied from the supply part 26 is, for example, in the range of 30° C. to 250° C., preferably in the range of 50° C. to 250° C., and more preferably in the range of 70° C. to 200° C. This mixed gas may be heated to a higher temperature than the temperature around the sheath 24 by the heating part 261, or may originally have a higher temperature than the temperature around the sheath 24.

The mixed gas supplied from the supply part 26 to the housing 22 is led into each through hole 111 of the support 11 from the left end of the zeolite membrane complex 1 in FIG. 1, as indicated by an arrow 251. Gases with high permeability (e.g., $CO_2$; hereinafter referred to as "highly permeable substances") in the mixed gas are led out from the outer side face of the support 11 through the zeolite membrane 12 provided on the inner side face of each through hole 111 and through the support 11. In this way, the highly permeable substances are separated from gases with low permeability (e.g., $CH_4$; hereinafter referred to as "low permeable substances") in the mixed gas (step S12).

The gases led out from the outer side face of the support 11 through the zeolite membrane complex 1 (hereinafter, referred to as "permeated substances") are led from the housing 22 into the exterior space 240 through the second exhaust port 223, as indicated by an arrow 253 (step S13). The permeated substances led from the housing 22 into the exterior space 240 are diffused substantially throughout the exterior space 240 and flow toward the exterior exhaust port 241 while coming in direct contact with the outer surface of the housing 22 and the inner surface of the sheath 24. In the separation apparatus 2, a temperature drop in the housing 22 due to heat dissipation to the outside can be suppressed as a result of the exterior space 240 being filled with the permeated substances having a higher temperature than the temperature around the sheath 24. The permeated substances flowing through the exterior space 240 are exhausted out of the exterior space 240 through the exterior exhaust port 241 to the outside of the sheath 24, as indicated by an arrow 254, and are recovered by the second recovery part 28 (step S14). The pressures of the gases recovered by the second recovery part 28 (i.e., permeation pressures) are, for example, approximately one atmospheric pressure (0.101 MPa).

In the example illustrated in FIG. 1, the exhaust direction 253 in which the permeated substances are exhausted to the outside of the housing 22 through the second exhaust port 223 (i.e., a lead-in direction 253 in which the permeated substances are led into the exterior space 240) is substantially parallel to the direction of the normal to the outer side face of the housing 22 (i.e., a radial direction perpendicular to the aforementioned longitudinal direction). Also, the exhaust direction 254 in which the permeated substances are exhausted to the outside of the sheath 24 through the exterior exhaust port 241 is substantially parallel to the aforementioned longitudinal direction. Accordingly, the angle formed by the lead-in direction 253 of the permeated substances into the exterior space 240 and the exhaust direction 254 from the exterior space 240 is approximately 90 degrees. In the separation apparatus 2, this angle may be changed appropriately in the range of 0 to 180 degrees.

In the mixed gas, gases other than the gases that have permeated through the zeolite membrane complex 1 (hereinafter, referred to as "non-permeated substances") pass through each through hole 111 of the support 11 from the left side to the right side in FIG. 1. The non-permeated substances are exhausted to the outsides of the housing 22 and the sheath 24 through the first exhaust port 222, as indicated by an arrow 252, and are recovered by the first recovery part 27. The pressures of the gases recovered by the first recovery part 27 through the first exhaust port 222 are, for example, approximately the same as the initial pressure. The non-permeated substances may include highly permeable substances that have not permeated through the zeolite membrane 12, in addition to the aforementioned low permeable substances.

Figure 6:
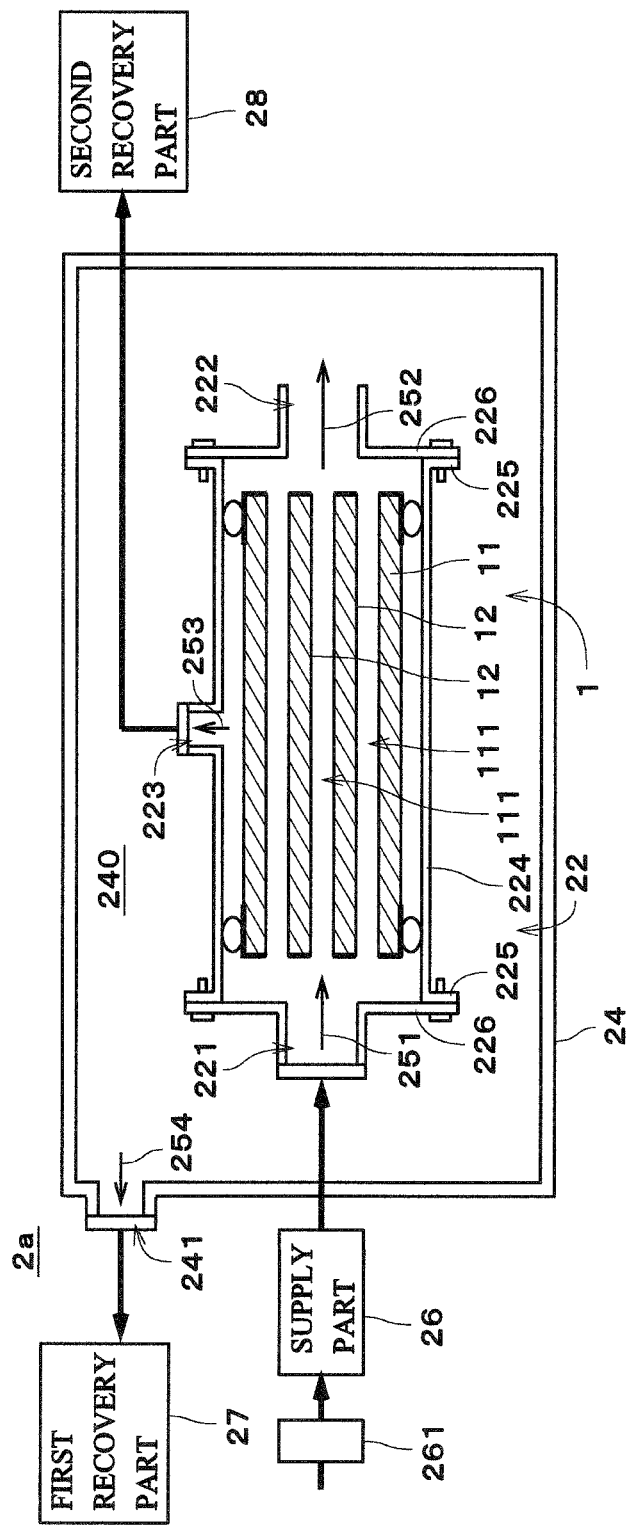
FIG. 6 is an illustration of a separation apparatus according to a second embodiment.

Next, a separation apparatus according to a second embodiment of the present invention will be described. FIG. 6 is an illustration of a schematic structure of a separation apparatus 2a according to the second embodiment of the present invention. The separation apparatus 2a differs from the separation apparatus illustrated in FIG. 1 in the form of connection between the first exhaust port 222 of the housing 22 and the first recovery part 27 and in the form of connection between the second exhaust port 223 and the second recovery part 28. The other configuration of the separation apparatus 2a is substantially the same as that of the separation apparatus 2 illustrated in FIG. 1, and in the following description, constituent elements of the separation apparatus 2a that correspond to those of the separation apparatus 2 are given the same reference signs.

As illustrated in FIG. 6, in the separation apparatus 2a, the second exhaust port 223 of the housing 22 is not open to the exterior space 240, and is connected to the second recovery part 28 arranged outside the sheath 24 by piping that passes air-tight through the sheath 24. Therefore, permeated substances exhausted from the second exhaust port 223 are recovered by the second recovery part 28 without being led into the exterior space 240.

On the other hand, the first exhaust port 222 of the housing 22 is open to the exterior space 240. The exterior exhaust port 241 is connected to the first recovery part 27. Non-permeated substances exhausted from the first exhaust port 222 into the exterior space 240 flow through the exterior space 240 toward the exterior exhaust port 241. That is, in the example illustrated in FIG. 6, the first exhaust port 222 serves as a lead-in port through which gases can be led into the exterior space 240. The non-permeated substances are exhausted to the outside of the sheath 24 through the exterior exhaust port 241 and recovered by the first recovery part 27.

Alternatively, the first exhaust port 222 of the housing 22 may be connected to the first recovery part 27 by piping that extends through the internal space of the sheath 24 and passes air-tight through the sheath 24. In this case, the destination to which gases from the first exhaust port 222 are sent out is switched by a valve or other device, so as to switch the first exhaust port 222 between a state of being connected to the first recovery part 27 by the aforementioned piping and a state of functioning as a lead-in port that is open to the internal space of the sheath 24. In this case, the exterior exhaust port 241 may be connected to the first recovery part 27, or may not be connected to the first recovery part 27. With the first exhaust port 222 connected to the first recovery part 27 by the above-described piping, gases exhausted from the first exhaust port 222 are exhausted to the outside of the sheath 24 without being supplied to the exterior space 240. That is, the gases exhausted from the first exhaust port 222 of the housing 22 can be led into the exterior space 240 through the first exhaust port 222 (i.e., the lead-in port), but it is also possible not to lead these gases into the exterior space 240.

Among the gases exhausted from the first exhaust port 222, some may be led into the exterior space 240 through the first exhaust port 222, and the remaining may be exhausted out of the sheath 24 without being led into the exterior space 240. As described above, the number of exterior exhaust ports 241 provided on the sheath 24 may be one, or may be two or more. Each exterior exhaust port 241 can be opened or closed as necessary. In the case where the sheath 24 has a plurality of exterior exhaust ports 241, gases led into the exterior space 240 may be exhausted from one or more exterior exhaust ports 241 to the outside of the sheath 24.

Figure 7:
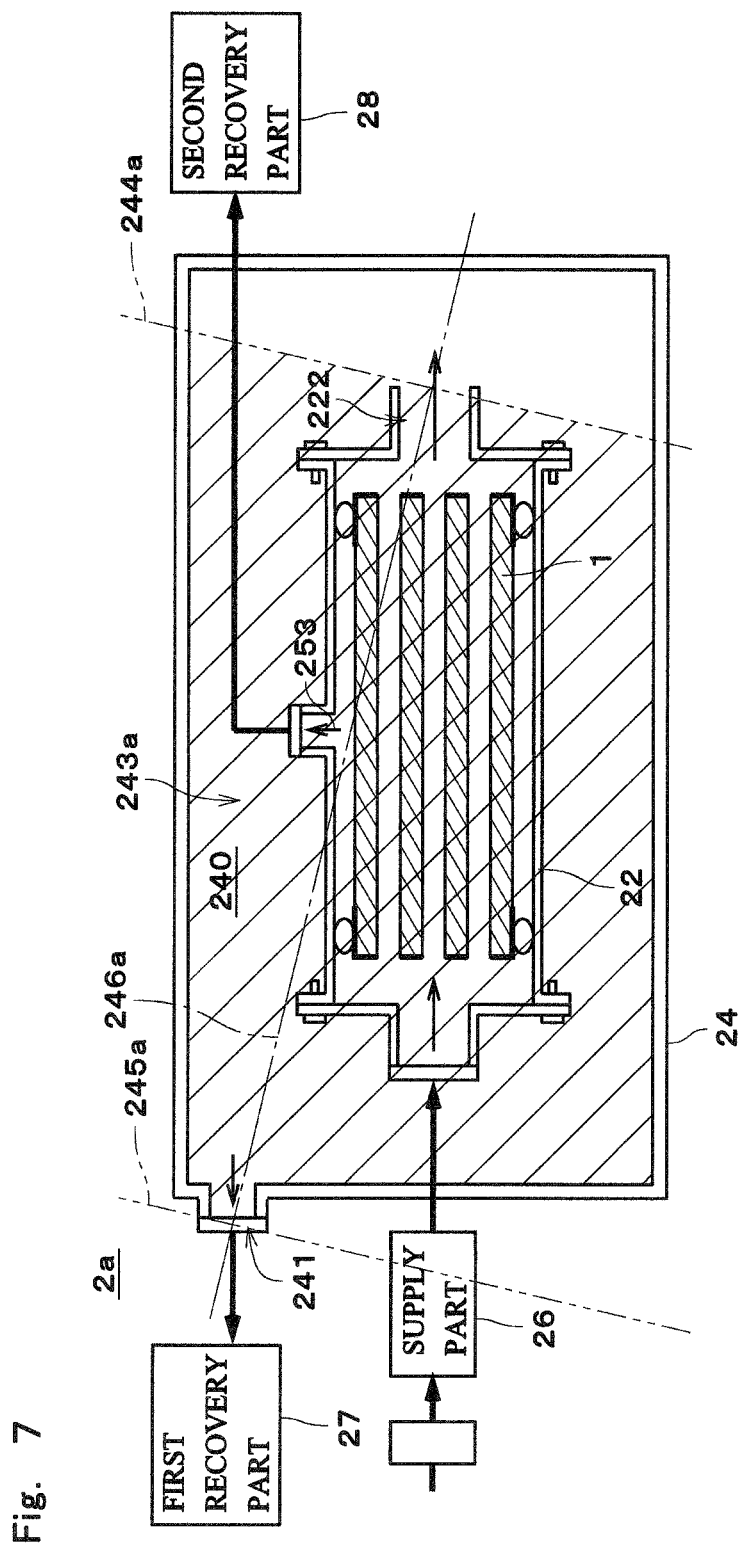
FIG. 7 is an illustration of a separation apparatus.

In the separation apparatus 2a, at least part of the zeolite membrane complex 1 is included in an inter-port space 243a indicated by cross-hatching in FIG. 7. As described above, the inter-port space 243a refers to a space surrounded by the sheath 24, the lead-in port (in the example illustrated in FIG. 7, the first exhaust port 222), and the exterior exhaust port 241. In other words, the inter-port space 243a is the internal space of the sheath 24 and is also a space sandwiched between a lead-in-port plane 244a and an exterior-exhaust-port plane 245a, the lead-in-port plane 244a being a plane that passes through substantially the center of the lead-in port and that is vertical to a straight line 246a connecting substantially the center of the lead-in port of the housing 22 and substantially the center of the exterior exhaust port 241, and the exterior-exhaust-port plane 245a being a plane that passes through substantially the center of the exterior exhaust port 241 and that is vertical to the straight line 246a connecting substantially the center of the lead-in port of the housing 22 and substantially the center of the exterior exhaust port 241. In the separation apparatus 2a, the lead-in port and the exterior exhaust port 241 are arranged such that at least part of the zeolite membrane complex 1 is included in the inter-port space 243a. Preferably, 50 percent or more of the zeolite membrane complex 1 by volume is included in the inter-port space 243a.

Figure 5:
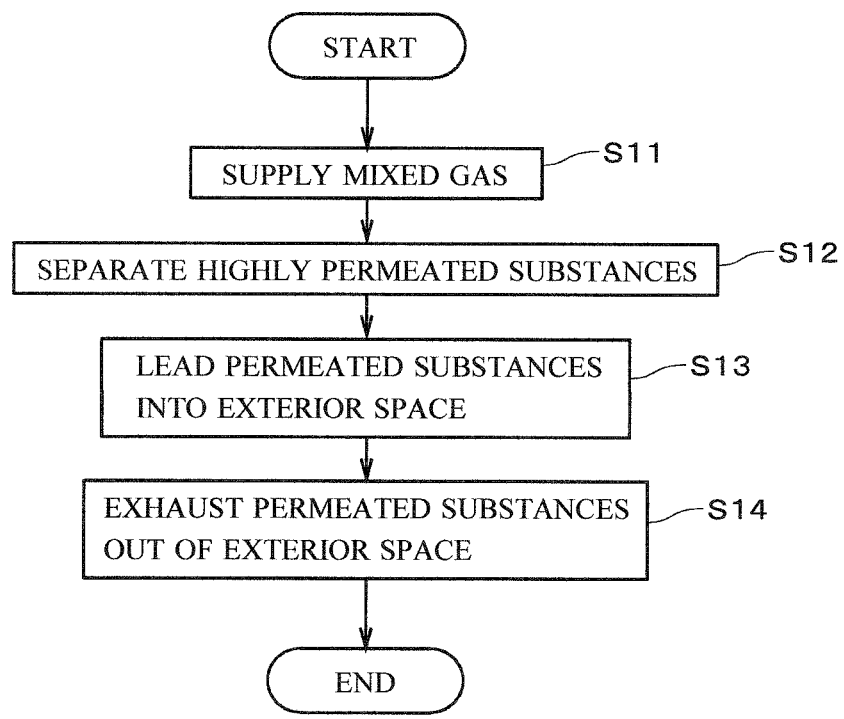
FIG. 5 is an illustration of a procedure for fluid separation.
Figure 8:
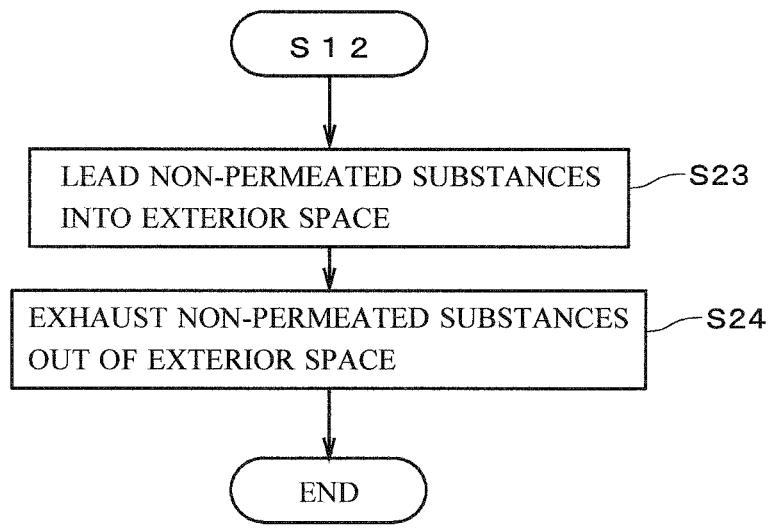
FIG. 8 is an illustration of a part of the procedure for fluid separation.

The procedure for mixed-gas separation performed by the separation apparatus 2a is substantially the same as the procedure for mixed-gas separation performed by the separation apparatus 2, except that steps S13 and S14 in FIG. 5 are replaced by steps S23 and S24 in FIG. 8. In the separation apparatus 2a, first, a mixed gas having a higher temperature than the temperature around the sheath 24 is supplied from the supply part 26 to the internal space of the housing 22 (FIG. 5: step S11).

The mixed gas supplied to the housing 22 is led into each through hole 111 of the support 11 as indicated by an arrow 251. Highly permeable substances in the mixed gas are led out of the outer side face of the support 11 through the zeolite membrane 12 provided on the inner side face of each through hole 111 and through the support 11. Accordingly, the highly permeable substances are separated from low permeable substances (FIG. 5: step S12).

The permeated substances that have permeated through the zeolite membrane complex 1 are exhausted to the outsides of the housing 22 and the sheath 24 through the second exhaust port 223, as indicated by an arrow 253, and are recovered by the second recovery part 28. The pressures of the gases recovered by the second recovery part 28 (i.e., permeation pressure) are, for example, approximately one atmospheric pressure (0.101 MPa).

On the other hand, non-permeated substances that are other than the permeated substances in the mixed gas pass through each through hole 111 of the support 11 and are led from the housing 22 to the exterior space 240 through the first exhaust port 222, as indicated by an arrow 252 (FIG. 8: step S23). The non-permeated substances led from the housing 22 into the exterior space 240 are diffused substantially throughout the exterior space 240 and flow toward the exterior exhaust port 241 while coming in direct contact with the outer surface of the housing 22 and the inner surface of the sheath 24. In the separation apparatus 2a, a temperature drop in the housing 22 due to heat dissipation to the outside can be suppressed as a result of the exterior space 240 being filled with the non-permeated substances having higher temperatures than the temperature around the sheath 24. The non-permeated substances flowing through the exterior space 240 are exhausted from the exterior space 240 to the outside of the sheath 24 through the exterior exhaust port 241, as indicated by an arrow 254, and are recovered by the first recovery part 27 (FIG. 8: step S24). The pressures of the gases recovered by the first recovery part 27 are, for example, substantially the same as the initial pressure. The non-permeated substances may include highly permeable substances that have not permeated through the zeolite membrane 12, in addition to the aforementioned low permeable substances.

In the example illustrated in FIG. 6, the exhaust direction 252 in which the non-permeated substances are exhausted to the outside of the housing 22 through the first exhaust port 222 (i.e., the lead-in direction 252 in which the non-permeated substances are led into the exterior space 240) is substantially parallel to the aforementioned longitudinal direction and is a rightward direction in FIG. 6. The exhaust direction 254 in which the non-permeated substances are exhausted to the outside of the sheath 24 through the exterior exhaust port 241 is substantially parallel to the aforementioned longitudinal direction and is a leftward direction in FIG. 6. Accordingly, the angle formed by the lead-in direction 252 of the non-permeated substances into the exterior space 240 and the exhaust direction 254 from the exterior space 240 are approximately 180 degrees. In the separation apparatus 2a, this angle may be changed appropriately in the range of 0 to 180 degrees.

As described above, the separation apparatuses 2 and 2a include a separation membrane complex (i.e., the zeolite membrane complex 1), the housing 22, the sheath 24, and the supply part 26. The zeolite membrane complex 1 includes the porous support 11 and the separation membrane (i.e., the zeolite membrane 12) formed on the support 11. The housing 22 includes therein the zeolite membrane complex 1. The sheath 24 includes therein the housing 22. The supply part 26 supplies a fluid to the inside of the housing 22. This fluid has a higher temperature than the temperature around the sheath 24. The housing 22 has the first exhaust port 222 and the second exhaust port 223. The first exhaust port 222 exhausts non-permeated substance in the fluid to the outside of the housing 22, the non-permeated substances being substances other than permeated substances that have permeated through the zeolite membrane complex 1. The second exhaust port 223 exhausts permeated substances in the fluid to the outside of the housing 22.

Either of the permeated substances and the non-permeated substances, exhausted from the housing 22, can be led into the exterior space 240 through the lead-in port (i.e., the second exhaust port 223 or the first exhaust port 222), the exterior space being a space inside the sheath 24 and between the sheath 24 and the housing 22. Thus, in the separation apparatuses 2 and 2a, a temperature drop in the housing 22 due to heat dissipation to the surroundings can be suppressed as a result of either of the permeated substances and the non-permeated substances with higher temperatures than the temperature around the sheath 24, described above, flowing through the exterior space 240. Accordingly, temperature drops in the fluid inside the housing 22, in the permeated substances, and in the non-permeated substances can be suppressed. As a result, it is possible to reduce energy required for fluid separation performed under high temperatures. Note that either of the permeated substances and the non-permeated substances described above are permeated substances in the case of the separation apparatus 2, and are non-permeated substances in the case of the separation apparatus 2a. The pressures of the substances flowing through the exterior space 240 are preferably higher than or equal to atmospheric pressure because in this case, the temperature drop in the housing 22 can be further suppressed. The pressures of the substances flowing through the exterior space 240 are also preferably less than or equal to a pressure of 10 atmospheres because in this case, the structure of the sheath 24 can be achieved with more ease and at lower cost.

As described above, in the separation apparatuses 2 and 2a, the sheath 24 has the exterior exhaust port 241 through which either of the permeated substances and the non-permeated substances described above, led into the exterior space 240 through the above-described lead-in port, can be exhausted. Moreover, at least part of the zeolite membrane complex 1 is included in the space surrounded by the sheath 24 (i.e., the inter-port space 243 or 243a), the lead-in port, and the exterior exhaust port 241. Accordingly, either of the permeated substances and the non-permeated substances described above, led from the housing 22 into the exterior space 240 through the lead-in port and flowing toward the outside of the sheath 24, flows a relatively long distance through the exterior space 240 along a relatively complicated path so as to surround the housing 22, instead of flowing a short distance in one direction. As a result, heat dissipation from the housing 22 to the surroundings can be further suppressed. Accordingly, it is possible to further reduce the energy required for fluid separation performed under high temperatures.

As described above, the exterior space 240 preferably exists at least in the direction of the normal to the main surface of the zeolite membrane 12. As a result, the outer side face of the housing 22 is covered with the exterior space 240, and thereby it is possible to efficiently suppress heat dissipation from the housing 22 to the surroundings.

As described above, the housing 22 preferably includes the tube-shaped part 224, the flange part 225, and the lid part 226. The tube-shaped part 224 has an opening at least at one end. The flange part 225 extends outward from the tube-shaped part 224 around this opening. The lid part 226 is fixed to the flange part 225 while covering this opening so as to seal the opening. The housing 22 with this structure may cause a relatively large temperature drop in the housing 22 due to heat dissipation from the flange part 225. Therefore, the separation apparatuses 2 and 2a capable of suppressing a temperature drop in the housing 22 are in particular suitable for use as separation apparatuses including the housing 22 with the above-described structure.

As described above, it is preferable that 50 percent or more of the zeolite membrane complex 1 by volume is included in the space surrounded by the sheath 24 (i.e., the inter-port space 243 or 243a), the above-described lead-in port, and the exterior exhaust port 241. This further suppresses heat dissipation from the housing 22 to the surroundings and further reduces the energy required for fluid separation performed under high temperatures.

As described above, either of the permeated substances and the non-permeated substances described above are permeated substances in the case of the separation apparatus 2. As a result of leading the permeated substances with lower pressure than non-permeated substances into the exterior space 240, it is possible to simplify the structure of the sheath 24 (i.e., reduce the size and/or weight of the sheath 24).

As described above, the separation apparatuses 2 and 2a preferably further include the heating part 261 that heats the fluid before the fluid is supplied to the housing 22. In this case, even if the fluid has a low temperature before supplied to the separation apparatuses 2 and 2a, the separation apparatuses 2 and 2a can easily achieve fluid separation under high temperatures. As the heating part 261, any of various devices such as an electric heater, a heat exchanger, and a heat pump can be employed.

As described above, the temperature of the fluid supplied from the supply part 26 is preferably higher than or equal to 70° C. Since the temperature drop in the housing 22 can be suppressed in the separation apparatuses 2 and 2a as described above, the structures of the separation apparatuses 2 and 2a are in particular suitable for use in the case where the fluid supplied from the supply part 26 has a relatively high temperature (i.e., there is a large difference in temperature between the fluid and the surroundings of the sheath 24).

As described above, the separation membrane of the separation membrane complex is preferably the zeolite membrane 12. As a result of using the zeolite membrane 12 with an intrinsic pore diameter as the separation membrane, it is possible to favorably achieve selective permeation of substances targeted for permeation through the separation membrane and to efficiently separate these substances targeted for permeation from the fluid.

A maximum number of membered rings in the zeolite constituting the zeolite membrane 12 is preferably 8 or less. In this case, it is possible to favorably achieve selective permeation of substances targeted for permeation, such as $H_2$ or $CO_2$, which have relatively small molecular diameters, and to efficiently separate these substances targeted for permeation from the fluid.

As described above, the method of operating the separation apparatuses 2 and 2a includes the step of supplying a fluid having a higher temperature than the temperature around the sheath 24 to the inside of the housing 22 (step S11), the step of leading either of the permeated substances that have permeated through the separation membrane complex (i.e., the zeolite membrane complex 1) in the fluid and the non-permeated substances that are other than the permeated substances in the fluid into the exterior space 240 (step S13 or S23), the exterior space 240 being a space inside the sheath 24 and between the sheath 24 and the housing 22, and the step of exhausting either of the permeated substances and the non-permeated substances described above from the exterior space 240 through at least part of the exterior space 240 (step S14 or S24), the exterior space 240 existing in the direction of the normal to the main surface of the separation membrane (i.e., zeolite membrane 12). Accordingly, it is possible, as described above, to suppress a temperature drop in the housing 22 due to heat dissipation to the surroundings and, as a result, to reduce the energy required for fluid separation performed under high temperatures.

In the exterior space 240 in the separation apparatus 2 illustrated in FIG. 1, a partition plate may be provided in the space between the outer side face of the housing 22 and the inner side face of the sheath 24 so as to form a flow path that extends spirally around the housing 22 in the longitudinal direction. This flow path connects the space on the right side of the housing 22 and the space on the left side. As a result of flowing through this flow path, the relatively high-temperature permeated substances exhausted from the second exhaust port 223 come in direct contact with substantially the entire outer side face of the housing 22. This suppresses heat dissipation from the housing 22 to the surroundings and thereby reduces the energy required for fluid separation performed under high temperatures. Note that the aforementioned flow path does not necessarily have to be spiral. For example, a labyrinth (i.e., zigzag) flow path may be formed by alternately arranging partition plates that extend radially outward from the outer side face of the housing 22 and partition plates that extend radially inward from the inner side face of the sheath 24, in the longitudinal direction. The same applies to the separation apparatus 2a.

Figure 9:
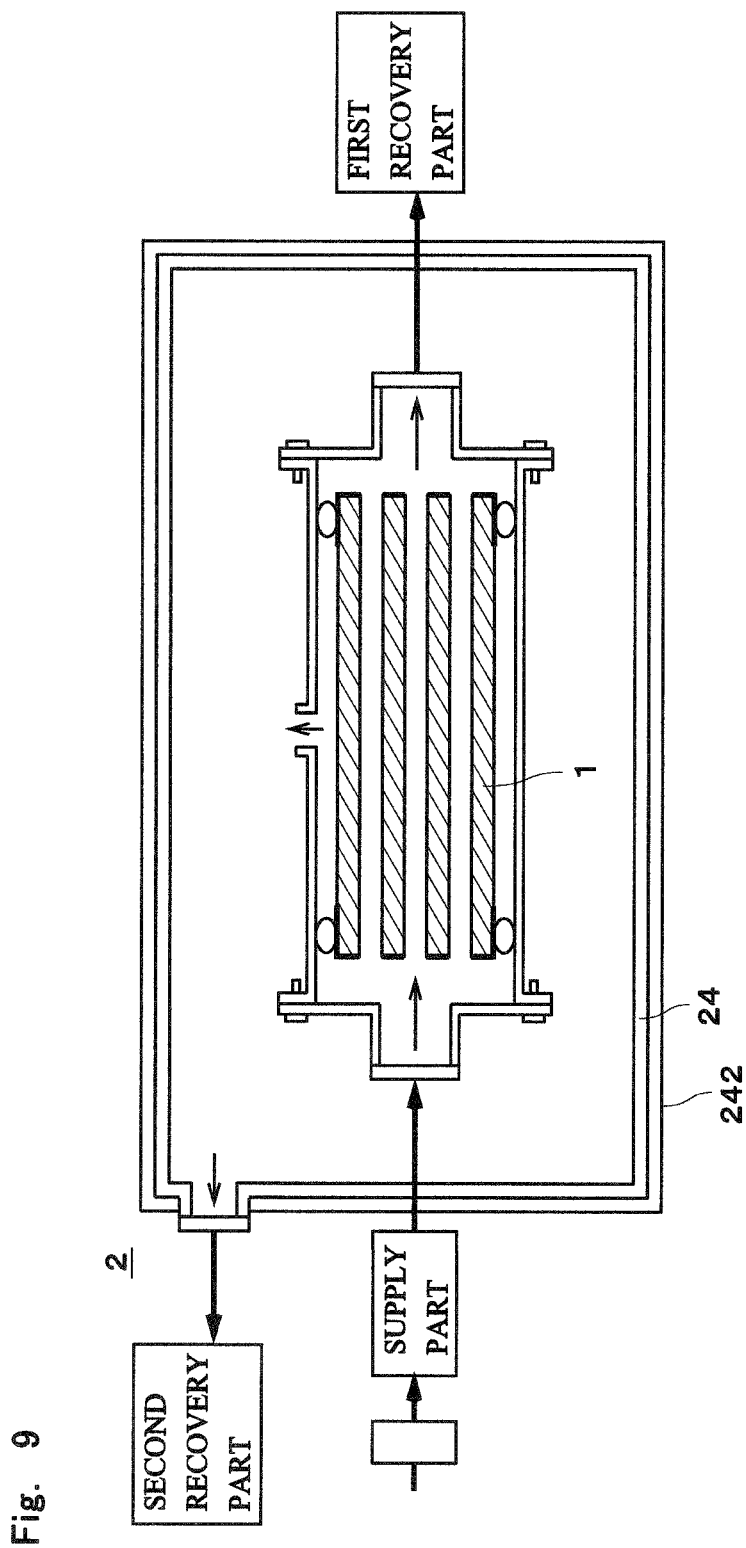
FIG. 9 is an illustration of another separation apparatus.

As illustrated in FIG. 9, the aforementioned separation apparatus 2 may include a thermal insulation part 242 that is arranged around the sheath 24 and thermally insulates at least part of the outer surface of the sheath 24. This suppresses heat dissipation from the sheath 24 to the surroundings and thereby further reduces the energy required for fluid separation performed by the zeolite membrane complex 1 under high temperatures. The thermal insulation part 242 is preferably configured to thermally insulate substantially the entire outer surface of the sheath 24. This further suppresses heat dissipation from the sheath 24 to the surroundings. The same applies to the separation apparatus 2a illustrated in FIG. 6. The thermal insulation part 242 is, for example, a heat insulating material such as glass wool or cellulose fiber that converts the outer surface of the sheath 24. Alternatively, the thermal insulation part 242 may be another sheath arranged around the sheath 24. As the thermal insulation part 242, any of various materials other than the heat insulating material can be employed.

Figure 10:
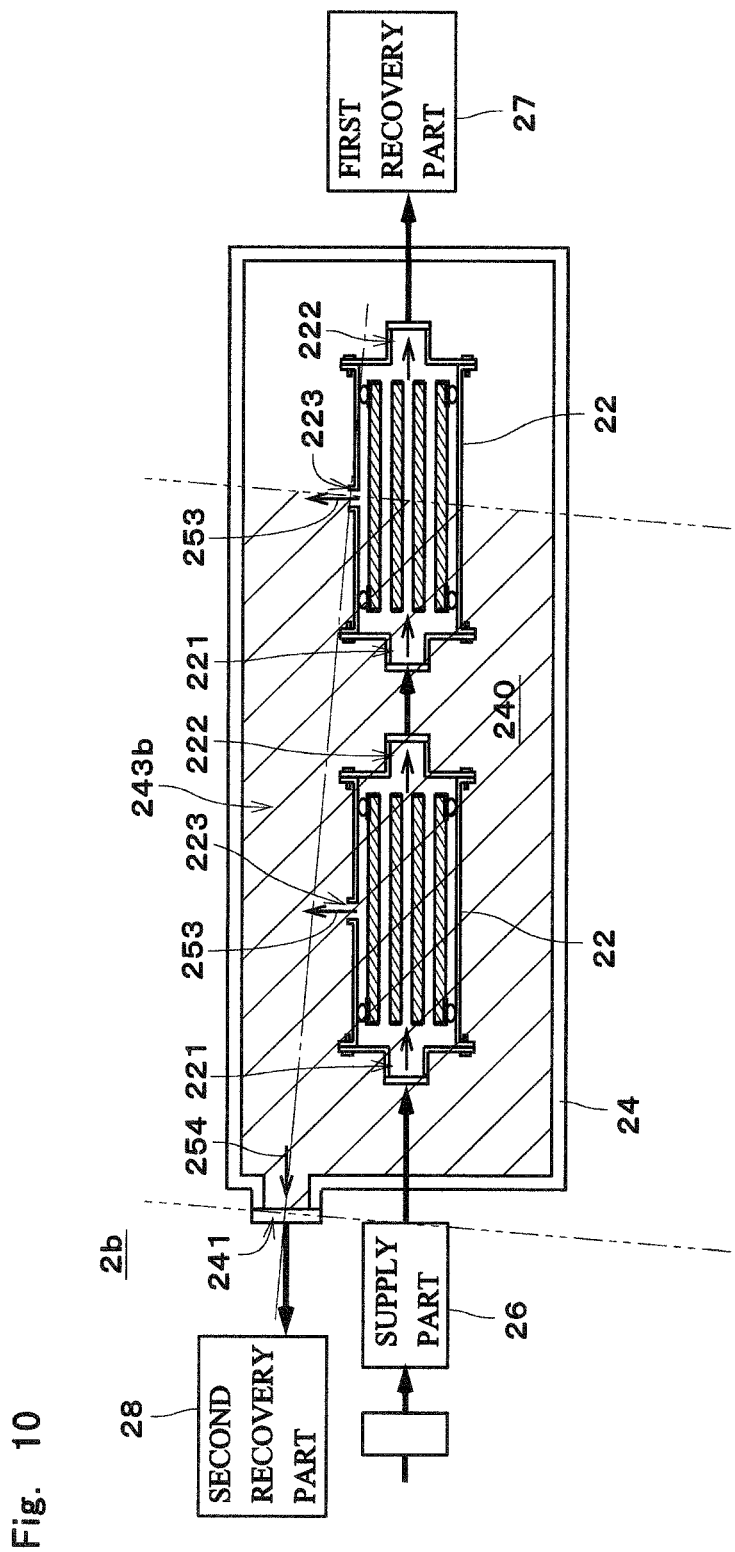
FIG. 10 is an illustration of another separation apparatus.

FIG. 10 is an illustration of a schematic structure of another preferable separation apparatus 2b. In the separation apparatus 2b, two housings 22 are placed inside a sheath 24. The two housings 22 have substantially the same internal structure as the housing 22 described above. A supply port 221 of the housing 22 on the left side in FIG. 10 is connected to a supply part 26, and a second exhaust port 223 thereof is open to an exterior space 240. A first exhaust port 222 of the housing 22 on the left side in FIG. 10 is connected to a supply port 221 of the housing 22 on the right side. Non-permeated substances exhausted from this first exhaust port 222 are supplied to the right housing 22, and the right housing 22 performs separation of highly permeable substances once again. A first exhaust port 222 of the right housing 22 is connected to a first recovery part 27, and a second exhaust port 223 thereof is open to the exterior space 240. That is, in the example illustrated in FIG. 10, the two second exhaust ports 223 serve as lead-in ports through which gases can be led into the exterior space 240.

Permeated substances that have relatively high temperatures (i.e., temperatures higher than the temperature around the sheath 24) and that are led from the two housings 22 into the exterior space 240 flow through the exterior space 240 while coming in direct contact with the outer side faces of the two housings 22 and the inner side face of the sheath 24, and are exhausted to the outside of the sheath 24 through an exterior exhaust port 241 and recovered by a second recovery part 28. Accordingly, it is possible to suppress temperature drops in the two housings 22 due to heat dissipation to the surroundings and, as a result, to reduce energy required for fluid separation performed under high temperatures.

Alternatively, each of the second exhaust ports 223 may be connected to the second recovery part 28 by piping that extends through the inner space of the sheath 24 and passes air-tight through the sheath 24. In this case, the destination to which gases exhausted from each second exhaust port 223 are sent out is switched by a valve or other device, so as to switch the second exhaust port 223 between a state of being connected to the second recovery part 28 by the aforementioned piping and a state of functioning as a lead-in port that is open to the inner space of the sheath 24.

Moreover, at least part of the zeolite membrane complexes 1 in the two housings 22 is included in an inter-port space 243b of the separation apparatus 2b. With this structure, it is possible to further suppress heat dissipation from the housings 22 to the surroundings and, as a result, to further reduce the energy required for fluid separation performed under high temperatures. Preferably, 50 percent or more of the zeolite membrane complexes 1 by volume (i.e., more than one zeolite membrane complex 1 by volume) is included in the inter-port space 243b. This further reduces the energy required for fluid separation performed under high temperatures. In the separation apparatus 2b, three or more housings 22 may be placed inside the sheath 24.

Figure 11:
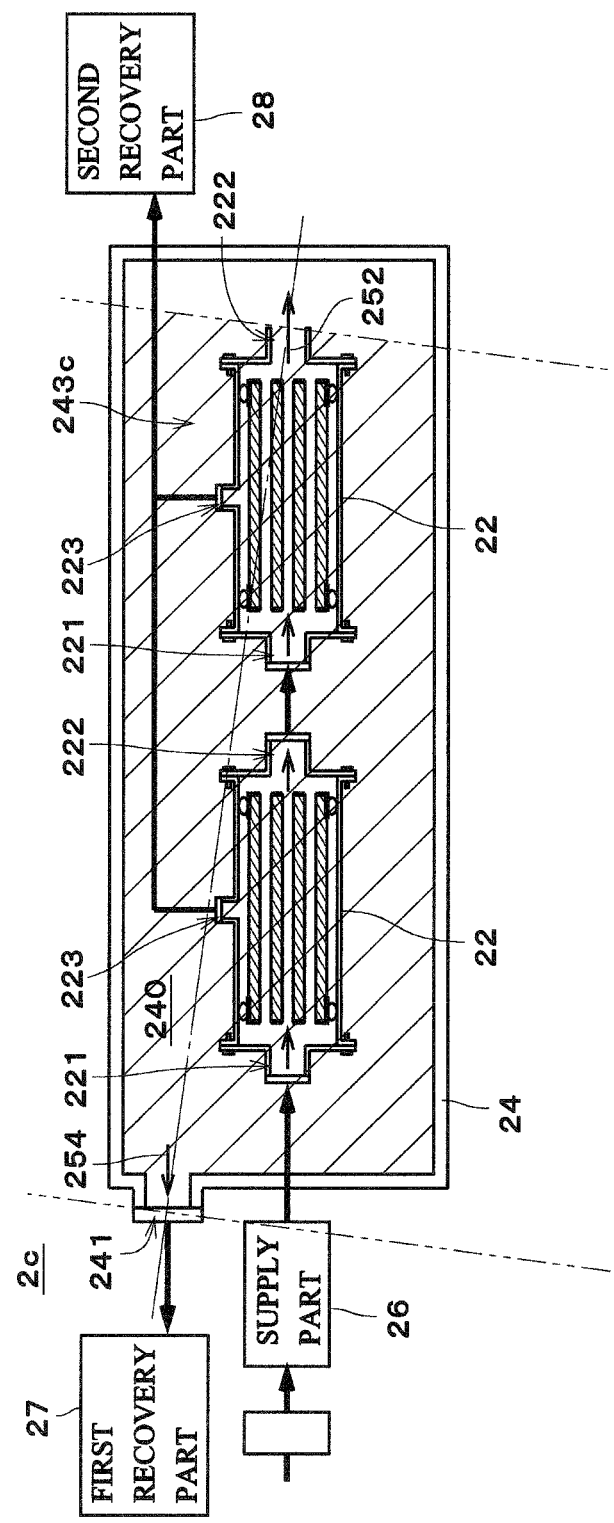
FIG. 11 is an illustration of another separation apparatus.

FIG. 11 is an illustration of a schematic structure of another preferable separation apparatus 2c. In the separation apparatus 2c, two housings 22 are placed inside the sheath 24 as in the separation apparatus 2b illustrated in FIG. 10. The two housings 22 have approximately the same internal structure as the housing 22 described above. A supply port 221 of the housing 22 on the left side in FIG. 11 is connected to a supply part 26, and a second exhaust port 223 thereof is connected to a second recovery part 28. A first exhaust port 222 of the housing 22 on the left side in FIG. 11 is connected to a supply port 221 of the housing 22 on the right side. Non-permeated substances exhausted from this first exhaust port 222 are supplied to the right housing 22, and the right housing 22 performs a separation of highly permeable substances once again. A first exhaust port 222 of the right housing 22 is open to an exterior space 240, and a second exhaust port 223 thereof is connected to the second recovery part 28. That is, in the example illustrated in FIG. 11, the first exhaust port 222 of the right housing 22 serves as a lead-in port through which gases can be led into the exterior space 240.

Non-permeated substances that have relatively high temperatures (i.e., temperatures higher than the temperature around the sheath 24) and that are led from the first exhaust port 222 of the right housing 22 into the exterior space 240 through the two housings 22 flow through the exterior space 240 while coming in direct contact with the outer side faces of the two housings 22 and the inner side face of the sheath 24, and are exhausted to the outside of the sheath 24 through an exterior exhaust port 241 and recovered by the first recovery part 27. Accordingly, it is possible to suppress temperature drops in the two housings 22 due to heat dissipation to the surroundings and, as a result, to reduce energy required for fluid separation performed under high temperatures.

Alternatively, the first exhaust port 222 of the right housing 22 may be connected to the first recovery part 27 by piping that extends through the internal space of the sheath 24 and passes air-tight through the sheath 24. In this case, the destination to which gases from the first exhaust port 222 of the right housing 22 are sent out is switched by a valve or other device, so as to switch this first exhaust port 222 between a state of being connected to the first recovery part 27 by the aforementioned piping and a state of functioning as a lead-in port that is open to the internal space of the sheath 24.

Moreover, at least part of the zeolite membrane complexes 1 in the two housings 22 is included in an inter-port space 243c of the separation apparatus 2c. With this structure, it is possible, as described above, to further suppress heat dissipation from the housings 22 to the surroundings and, as a result, to further reduce the energy required for fluid separation performed under high temperatures. Preferably, 50 percent or more of the zeolite membrane complexes 1 by volume (i.e., more than one zeolite membrane complex 1 by volume) is included in the inter-port space 243c. This further reduces the energy required for fluid separation performed under high temperatures. In the separation apparatus 2c, three or more housings 22 may be placed inside the sheath 24.

Figure 12:
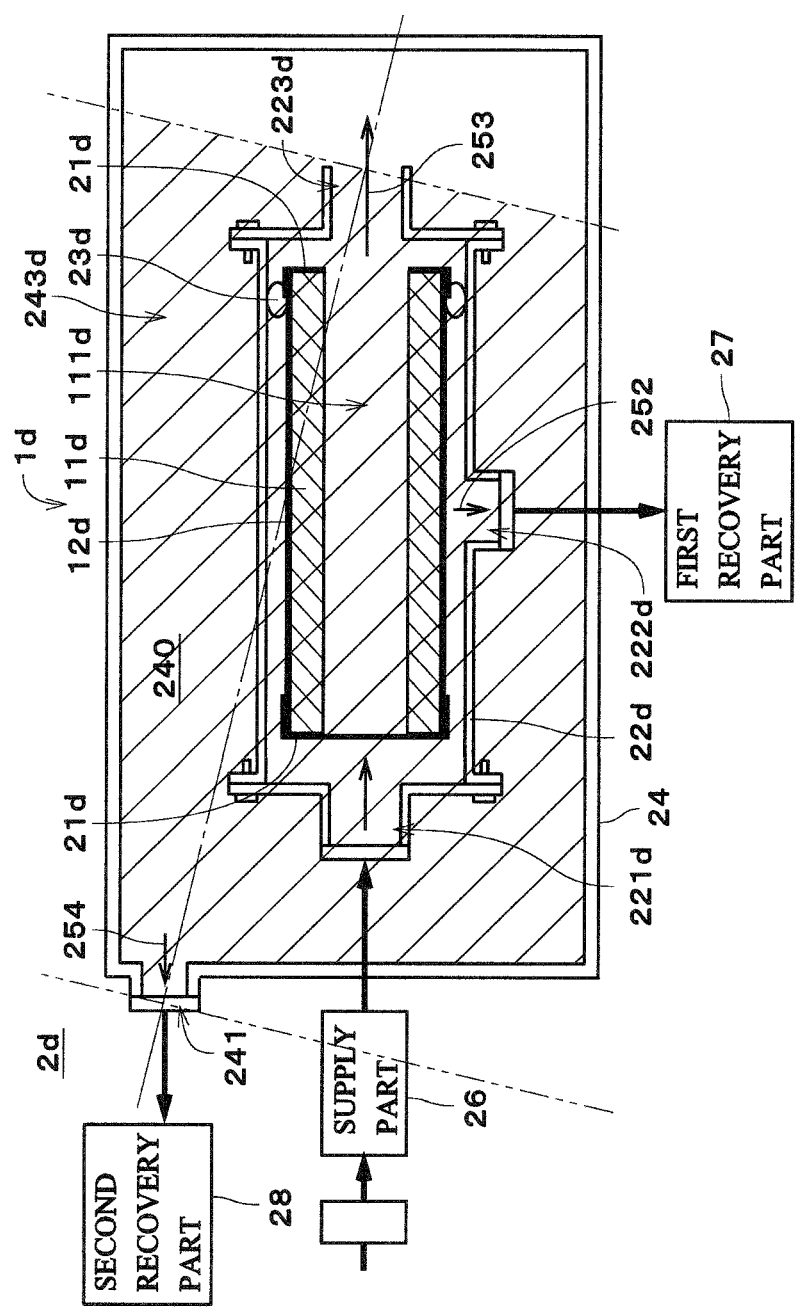
FIG. 12 is an illustration of another separation apparatus.

FIG. 12 is an illustration of a schematic structure of another preferable separation apparatus 2d. In the separation apparatus 2d, a tube-shaped zeolite membrane complex 1d is placed inside a housing 22d. The zeolite membrane complex 1d includes a substantially tube-shaped support 11d and a zeolite membrane 12d formed on the outer side face of the support 11d. The end of the zeolite membrane complex 1d on the left side in FIG. 12 is covered with a sealing part 21d, and this makes impossible the inflow and outflow of gases through this end, including a flow path 111d inside the support 11d (hereinafter, also referred to as an "internal flow path 111d"). On the other hand, as to the end on the right side in FIG. 12, only the end face of the support 11d is covered with the sealing part 21d, and the internal flow path 111d is open. Therefore, gases in the internal flow path can flow through this opening to the outside of the zeolite membrane complex 1d. In the vicinity of the end of the zeolite membrane complex 1d on the right side in FIG. 12, a seal member 23d is arranged between the outer side face of the zeolite membrane complex 1d and the inner side face of the housing 22d.

The housing 22d has a supply port 221d at the end on the left side in FIG. 12 and a second exhaust port 223d at the end on the right side. The housing 22d also has a first exhaust port 222d in the outer side face. The housing 22d is placed inside a sheath 24. The supply port 221d is connected to a supply part 26 by piping that passes through the sheath 24. The first exhaust port 222d is connected to a first recovery part 27 by piping that passes through the sheath 24. The second exhaust port 223d is open to an exterior space 240 between the sheath 24 and the housing 22d. That is, in the example illustrated in FIG. 12, the second exhaust port 223d serves as a lead-in port through which gases can be led into the exterior space 240.

Permeated substances that have permeated through the zeolite membrane complex 1d flow through the internal flow path 111d of the support 11d, and are led from the housing 22d to the exterior space 240 through the second exhaust port 223d as indicated by an arrow 253. The permeated substances led from the housing 22d into the exterior space 240 are diffused substantially throughout the exterior space 240 and flow toward an exterior exhaust port 241 while coming in direct contact with the outer surface of the housing 22d and the inner surface of the sheath 24. The permeated substances flowing through the exterior space 240 are exhausted from the exterior space 240 to the outside of the sheath 24 through the exterior exhaust port 241 as indicated by an arrow 254, and are recovered by a second recovery part 28.

Alternatively, the second exhaust port 223d may be connected to the second recovery part 28 by piping that extends through the internal space of the sheath 24 and passes air-tight through the sheath 24. In this case, the destination to which gases from the second exhaust port 223d are sent out is switched by a valve or other device, so as to switch the second exhaust port 223d between a state of being connected to the second recovery part 28 by the aforementioned piping and a state of functioning as a lead-in port that is open to the internal space of the sheath 24.

In the example illustrated in FIG. 12, the second exhaust port 223d (i.e., the lead-in port) thought which gases are exhausted to the outside of the housing 22d is located in the right part of the sheath 24 in FIG. 12, and the exhaust direction 253 of the permeated substances (i.e., the lead-in direction 253 of the permeated substances into the exterior space 240) is substantially parallel to the aforementioned longitudinal direction and is a rightward direction in FIG. 12. The exterior exhaust port 241 through which gases are exhausted to the outside of the sheath 24 is located on the left side in the sheath 24 in FIG. 12, and the exhaust direction 254 of the permeated substances is substantially parallel to the aforementioned longitudinal direction and is a leftward direction in FIG. 12. Accordingly, the zeolite membrane complex 1d as a whole is included in an inter-port space 243d surrounded by the sheath 24, the second exhaust port 223d, and the exterior exhaust port 241 in the separation apparatus 2d. Note that at least part of the zeolite membrane complex 1d may be included in the inter-port space 243d. With this structure, it is possible, as described above, to reduce energy required for fluid separation performed by the separation apparatus 2d under high temperatures. Preferably, 50 percent or more of the zeolite membrane complex 1d by volume is included in the inter-port space 243d. This further reduces the energy required for fluid separation performed under high temperatures.

In the separation apparatus 2d, the first exhaust port 222d of the housing 22d may be open to the exterior space 240, and the second exhaust port 223d may be connected to the second recovery part 28 by piping that passes air-tight through the sheath 24. In this case, the exterior exhaust port 241 is connected to the first recovery part 27. Even in this case, as a result of at least part of the zeolite membrane complex 1d being included in the inter-port space, it is possible to reduce the energy required for fluid separation performed under high temperatures. In the separation apparatus 2d, two or more housings 22d may be placed inside the sheath 24, as approximately in the same manner as the separation apparatuses 2b and 2c.

The above-described separation apparatuses 2 and 2a to 2d and the above-described method of operating each separation apparatus may be modified in various ways.

For example, the temperature of the fluid supplied from the supply part 26 may be less than 70° C. as long as it is higher than the temperature around the sheath 24. Moreover, the heating part 261 for heating the fluid may be omitted.

The shape of the housing(s) 22 may be modified in various ways, and for example, the flange part(s) 225 may be omitted. The same applies to the housing(s) 22d.

Each housing 22 may include therein a plurality of zeolite membrane complexes 1. In this case, the inter-port space 243 may include part of any of the zeolite membrane complexes 1. The same applies to the housing(s) 22d.

The sheath 24 may be surrounded by another sheath. The sheath 24 may include therein a plurality of sheathes.

In the separation apparatus 2, the exterior space 240 does not necessarily have to exist in the direction of the normal to the zeolite membrane 12 as long as the sheath 24 includes therein at least part of the housing 22. The same applies to the separation apparatuses 2a to 2d.

A maximum number of membered rings in the zeolite constituting the zeolite membrane 12 may be greater than 8.

In the separation apparatus 2, an inorganic membrane formed of an inorganic substance other than a zeolite, or a membrane other than inorganic membranes may be formed as the separation membrane on the support 11, instead of the zeolite membrane 12. The same applies to the separation apparatuses 2a to 2d.

In the separation apparatuses 2 and 2a to 2d, substances other than those in the above description may be separated from the fluid.

The separation apparatuses 2 and 2a to 2d may be used for the purpose of causing highly permeable substances with high temperatures to permeate through the zeolite membrane complex 1, instead of for the purpose of separating highly permeable substances and low permeable substances, achieved as a result.

The fluid supplied to the separation apparatuses 2 and 2a to 2d does not have to be a mixture of substances containing a plurality of types of gases or liquids.

The configurations of the above-described preferred embodiments and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention.

INDUSTRIAL APPLICABILITY

The separation apparatuses and the method of operating the separation apparatus according to the present invention are applicable to the separation of various fluids.

REFERENCE SIGNS LIST 1, 1d Zeolite membrane complex
2, 2a to 2d Separation apparatus
11, 11d Support
12, 12d Zeolite membrane
22, 22d Housing
24 Sheath
26 Supply part
221, 221d Supply port
222, 222d First exhaust port
223, 223d Second exhaust port
224 Tube-shaped part
225 Flange part
226 Lid part
240 Exterior space
243, 243a, 243b, 243c, 243d Inter-port space
261 Heating part
S11 to S14, S23 to S24 Step

The invention claimed is:

1. A separation apparatus comprising:
a separation membrane complex including a porous support and a separation membrane formed on said support;
a housing including therein said separation membrane complex;
a sheath including therein said housing; and
a supply part that supplies a fluid having a temperature higher than a temperature around said sheath to an inside of said housing,
wherein said housing includes:
a first exhaust port through which a non-permeated substance in said fluid is exhausted to an outside of said housing, the non-permeated substance being a substance other than a permeated substance that has permeated through said separation membrane complex; and
a second exhaust port through which said permeated substance in said fluid is exhausted to the outside of said housing,
either of said permeated substance and said non-permeated substance exhausted from said housing can be led into an exterior space through either of said second exhaust port and said first exhaust port, respectively, serving as a lead-in port, the exterior space being a space inside said sheath and between said sheath and said housing,
said sheath includes an exterior exhaust port through which said either of said permeated substance and said non-permeated substance, led into said exterior space through said lead-in port, is exhausted, and
at least part of said separation membrane complex is included in a space surrounded by said sheath, said lead-in port, and said exterior exhaust port.

2. The separation apparatus according to claim 1, wherein said exterior space exists at least in a direction of a normal to a main surface of said separation membrane.

3. The separation apparatus according to claim 1, wherein said housing includes:
a tube-shaped part having an opening at least at one end;
a flange part extending outward from said tube-shaped part around said opening; and
a lid part fixed to said flange part while covering said opening to seal said opening.

4. The separation apparatus according to claim 1, wherein 50 percent or more of said separation membrane complex by volume is included in said space surrounded by said sheath, said lead-in port, and said exterior exhaust port.

5. The separation apparatus according to claim 1, wherein said either of said permeated substance and said non-permeated substance led into said exterior space is said permeated substance.

6. The separation apparatus according to claim 1, further comprising:
a heating part that heats said fluid before said fluid is supplied to said housing.

7. The separation apparatus according to claim 1, wherein said fluid supplied from said supply part has a temperature higher than or equal to 70° C.

8. The separation apparatus according to claim 1, further comprising:
a thermal insulation part arranged around said sheath to thermally insulate at least part of an outer surface of said sheath.

9. The separation apparatus according to claim 1, wherein said separation membrane is a zeolite membrane.

10. The separation apparatus according to claim 9, wherein
a maximum number of membered rings in a zeolite constituting said zeolite membrane is 8 or less.

11. The separation apparatus according to claim 9, wherein
said fluid contains one or more types of substances among hydrogen, helium, nitrogen, oxygen, water, steam, carbon monoxides, carbon dioxides, nitrogen oxides, ammonia, sulfur oxides, hydrogen sulfides, sulfur fluorides, mercury, arsine, hydrocyanic acids, carbonyl sulfides, C1 to C8 hydrocarbons, organic acids, alcohol, mercaptans, ester, ether, ketone, and aldehyde.

12. A method of operating the separation apparatus according to claim 1, the method comprising:
  a) supplying said fluid having a higher temperature than a temperature around said sheath to an inside of said housing;
  b) leading either of said permeated substance in said fluid and said non-permeated substance in said fluid into said exterior space through either of said second exhaust port and said first exhaust port, respectively, serving as a lead-in port; and
  c) exhausting said either of said permeated substance and said non-permeated substance from said exterior space, the exhausting substance passing through at least part of said exterior space, the exterior space existing in a direction of a normal to a main surface of said separation membrane.

\* \* \* \* \*